United States Patent
Kondo

(10) Patent No.: US 6,990,244 B2
(45) Date of Patent: Jan. 24, 2006

(54) INTEGRATIVE ENCODING SYSTEM AND ADAPTIVE DECODING SYSTEM

(75) Inventor: Tetsujiro Kondo, Kanagawa (JP)

(73) Assignee: Sony Corporation, Tokyo (JP)

( * ) Notice: Subject to any disclaimer, the term of this patent is extended or adjusted under 35 U.S.C. 154(b) by 222 days.

(21) Appl. No.: 10/602,232

(22) Filed: Jun. 24, 2003

(65) Prior Publication Data

US 2004/0086190 A1 May 6, 2004

Related U.S. Application Data

(62) Division of application No. 10/160,418, filed on May 31, 2002, now Pat. No. 6,636,640, which is a continuation of application No. 09/254,536, filed as application No. PCT/JP98/03116 on Jul. 10, 1998, now Pat. No. 6,480,630.

(30) Foreign Application Priority Data

Jul. 11, 1997 (JP) ............................................. 9-186144

(51) Int. Cl.
G06K 9/36 (2006.01)

(52) U.S. Cl. ..................................................... 382/239

(58) Field of Classification Search ................ 382/232, 382/239, 240; 375/240.02, 240.21, 240.25; 341/51, 79; 348/404.1, 424.2, 431.1
See application file for complete search history.

(56) References Cited

U.S. PATENT DOCUMENTS

| 5,068,726 A | | 11/1991 | Kondo et al. |
| 5,276,531 A | * | 1/1994 | Chen et al. .................. 358/443 |
| 5,436,665 A | * | 7/1995 | Ueno et al. ............ 375/240.14 |
| 5,517,588 A | | 5/1996 | Kondo |

(Continued)

FOREIGN PATENT DOCUMENTS

| DE | 690 28078 T2 | 6/1991 |
| DE | 693 16440 T2 | 11/1993 |
| EP | 0 373 924 A1 | 6/1990 |
| EP | 0 419 141 | 3/1991 |
| EP | 0 430 631 B1 | 6/1991 |

(Continued)

OTHER PUBLICATIONS

Patent Abstracts of Japan vol. 1995, No. 06, Jul. 31, 1995 & JP 07 087327 A Mar. 31, 1995.
Patent Abstracts of Japan vol. 015, No. 200, May 22, 1991 & JP 03 053778 A Mar. 7, 1991.
Patent Abstracts of Japan vol. 1997, No. 08, Aug. 29, 1997 & JP 09 093285 A Apr. 4, 1997.
Patent Abstracts of Japan vol. 1997, No. 06, Jun. 30, 1997 & JP 09 055673 A Feb. 25, 1997.

*Primary Examiner*—Jose L. Couso
(74) *Attorney, Agent, or Firm*—Frommer Lawrence & Haug LLP; William S. Frommer

(57) ABSTRACT

An integrative encoding system for encoding and transmitting a plurality of video signals having different resolutions that correspond to a plurality of display units. The integrative encoding system has a compression processor, an editing processor, and an integrated services digital broadcasting (ISDB) transmitter. In a first embodiment, the compression processor performs adaptive dynamic range coding (ADRC) to compress each of said plurality of video signals on a block basis by reducing the dynamic range. In another embodiment, the compression processor performs hierarchical encoding on the plurality of video signals by selectively replacing pixels of a higher resolution level with pixels from a lower resolution level calculated by combining pixels from said higher resolution level; thereby encoding a hierarchy of resolution levels within the plurality of video signals without increasing the amount of data. An adaptive decoding system receives and decodes the transmitted plurality of video signals for display by the plurality of display units.

4 Claims, 16 Drawing Sheets

U.S. PATENT DOCUMENTS

| | | |
|---|---|---|
| 5,539,586 A | 7/1996 | Inoue et al. |
| 5,559,553 A | 9/1996 | Bitek |
| 5,598,214 A | 1/1997 | Kondo et al. |
| 5,712,689 A | 1/1998 | Yasuki et al. |
| 5,796,858 A | 8/1998 | Zhou et al. |
| 5,930,398 A * | 7/1999 | Watney ................ 382/239 |
| 6,125,146 A * | 9/2000 | Frencken et al. ...... 375/240.24 |

FOREIGN PATENT DOCUMENTS

| | | |
|---|---|---|
| EP | 0 571 180 B1 | 11/1993 |
| EP | 0 618 727 A1 | 10/1994 |
| GB | 2 285 361 | 7/1995 |
| JP | 1-213088 | 8/1989 |
| JP | 3-167985 | 7/1991 |
| JP | 5-328185 | 12/1993 |
| JP | 7-87327 | 3/1995 |

* cited by examiner

A

B

ADRC PROCESSING

ADRC PROCESSING CIRCUIT

INTEGRATIVE ENCODING SYSTEM AND ADAPTIVE DECODING SYSTEM

This is a divisional of application Ser. No. 10/160,418, filed May 31, 2002 now U.S. Pat. No. 6,636,640, which is a continuation of application Ser. No. 09/254,536 filed Mar. 9, 1999, now U.S. Pat. No. 6,480,630, issued Nov. 12, 2002, which is a 371 of PCT/JP98/03116, filed Jul. 10, 1998.

FIELD OF THE ART

The present invention relates to a video encoder, video decoder, video processor and methods thereof, and more particularly to such methods and apparatuses capable of efficiently encoding a picture and further obtaining a decoded picture in an appropriate form to a monitor for displaying the picture.

BACKGROUND ART

FIG. 16 shows a structural example of a video transmission system for transmitting a picture from its transmitting side to receiving side.

On the transmitting side, in a high definition video camera 201, an object is imaged and a high definition picture formed of 1920×1035 pixels in horizontal by longitudinal in the 16:9 aspect ratio (hereinafter, it is preferably referred to as HD picture) is outputted, for example. The HD picture for approximately 30 frames will be normally outputted per second from the video camera 201. But here the HD picture is subjected to interlaced scanning. Therefore, the HD picture for approximately 60 fields is outputted per second from the video camera 201.

On the transmitting side, in a standard or low definition video camera 202, an object is imaged and a standard or low definition picture in the 4:3 aspect ratio (hereinafter, it is preferably referred to as SD picture) is outputted, for example. If the video camera 202 is in the national television system committee (NTSC) system or the phase alternation by line (PAL) system, one frame is formed of 720×480 pixels or 720×576 pixels respectively and the number of frames per second (the number of fields) is 30 (60) or 25 (50) respectively, for example.

On the transmitting side, in a progressive imager 203, an object is scanned and the scanned picture (hereinafter, it is preferably referred to as progressive picture) is sequentially outputted. And on the transmitting side, in a computer 204, a picture formed of, e.g., 640×480 pixels is generated and outputted as computer graphics (CG).

The ratio in horizontal to longitudinal of pixels that compose pictures to be outputted by the video cameras 201 and 202 is approximately 1:1.1. The ratio in horizontal to longitudinal of pixels that compose a picture to be outputted by the computer 204 is 1:1.

As the above, pictures different in its aspect ratio, the number of pixels, its scanned method, the ratio of pixels in horizontal and longitudinal, etc., will be outputted from the video cameras 201 and 202, progressive imager 203 and computer 204.

These pictures are inputted to an editor 205. In the editor 205, pictures from the video cameras 201 and 202, progressive imager 203 and computer 204 are edited respectively. All the edited pictures are converted into progressive pictures formed of, e.g., 1920×1080 pixels and outputted to a source encoder 206. In the source encoder 206, the pictures outputted from the editor 205 is coded (MPEG-coded) based on the moving picture experts group (MPEG) standard for example, and thus obtained coded data is supplied to a channel encoder 207.

The adoption of that converting all of pictures different in the number of pixels, its scanned method, etc., into 1920× 1080-pixel progressive pictures by advanced television (ATV) has been planned.

In the channel encoder 207, channel coding is performed to improve the reliability of the coded data in transmission. That is, in the channel encoder 207, e.g., error correcting codes (ECCs) are added to the coded data as processing for error correction, and further it is subjected to prescribed modulation or the like. The transmit data obtained by the processing in the channel encoder 207 is transmitted via a transmission line 211.

On the receiving side, the transmit data transmitted from the transmitting side as the above is received. This transmit data is supplied to a channel decoder 208 to be channel-decoded. Specifically, prescribed demodulation is performed and further error correction using the ECCs or the like is performed, for example.

The coded data obtained as a result of the processing in the channel decoder 208 is supplied to a source decoder 209. In the source decoder 209, the coded is expanded by, for example, decoded (MPEG-decoded) based on the MPEG standard, and thus obtained picture data is supplied to a processor 210.

In the processor 210, the picture data from the source decoder 209 is processed to be matched to the format of an output device to output the picture data. That is, in the case where the picture data is displayed in an HD display device 221 for displaying HD pictures, in the processor 210, the picture data outputted by the source decoder 209 is processed into an interlace-scanned HD picture composed of, e.g., 1920×1035 pixels in the 16:9 aspect ratio. In the case where the picture data displayed in an SD display device 222 for displaying SD pictures, in the processor 210, the picture data outputted by the source decoder 209 is processed into an SD picture in the NTSC system or the PAL system, composed of 720×480 pixels or 720×576 pixels for example. In the case where the picture data is printed out by a printer 223, in the processor 210, the picture outputted by the source decoder 209 is converted into a picture of which the ratio of pixels in horizontal to longitudinal is corresponded to the printer 223. On the other hand, in the case where the picture data is displayed on a computer display 224, in the processor 210, the picture data outputted by the source decoder 209 is processed into a picture composed of 640×480 pixels for example.

In the HD display device 221, the SD display device 222, the printer 223 and the computer display 224, the picture from the processor 210 is displayed or printed out.

By the way, heretofore, the editing processing by the editor 205, the compression processing by the source encoder 206 and the channel coding processing by the channel encoder 207 on the transmitting side have quasi conducted respectively and independently.

For example, the compressed data has less information amount than the data before compression processing. Thus, if the compressed data can be set to be edited, a load on the editor 205 can be reduced. However, if the picture is MPEG-coded in the source encoder 206 as described above, the bit stream obtained as its result becomes difficult to be edited unless in a group of picture (GOP) unit, and editing of that is limited to so-called cut editing by only connecting the GOPs. Since compression processing regardless of the editing processing by the editor 205 is performed in the source encoder 206, the compressed data cannot be edited in a frame unit and it is difficult to give various effects on it.

Moreover, for example, in the source encoder 206, compression processing is not performed in consideration of the addition of ECCs by the channel encoder 207. Therefore, for example, if ECCs are added to the coded data obtained by the compression processing, sometimes compressibility as the entire data after the addition of ECCs has deteriorated.

As the above, heretofore, since the processing necessary for picture coding, e.g., the editing processing, compression processing and channel coding processing, etc., has not performed in consideration of the other processing, it has been difficult to perform efficient processing.

DISCLOSURE OF INVENTION

The present invention is provided considering the above aspects, which enable it to perform efficient processing.

A video encoder according to the present invention is characterized by including a processing means for performing one or plural processing necessary to encode a picture considering the other processing.

A method for encoding a picture according to the present invention is characterized by performing one or more processing among the plural processing necessary to encode a picture considering the other processing.

A video decoder according to the present invention is characterized by including a generation means for generating a decoded picture corresponding to the resolution of an output device for outputting the picture by linearly coupling transmit data to prescribed coefficients.

A method for decoding a picture according to the present invention is characterized by generating a decoded picture corresponding to the resolution of an output device for outputting the picture by linearly coupling the transmit data to the prescribed coefficients.

A video processor according to the present invention is characterized by including a processing means for performing one or more processing among the plural processing necessary to encode a picture considering the other processing, and a generation means for generating a decoded picture corresponding to the resolution of an output device for outputting the picture by linearly coupling the data obtained as the result of processing by the processing means to the prescribed coefficients.

A method for processing a picture according to the present invention is characterized by performing one or more processing among the plural processing necessary to encode a picture considering the other processing, and generating a decoded picture corresponding to the resolution of an output device for outputting the picture by linearly coupling thus obtained data to the prescribed coefficients.

In the video encoder according to the present invention, the processing means performs one or more processing among the plural processing necessary to encode the picture considering the other processing.

In the method of encoding a picture according to the present invention, one or more processing among the plural processing necessary to encode the picture are performed considering the other processing.

In the video decoder according to the present invention, the generation means generates a decoded picture corresponding to the resolution of a output device for outputting the picture by linearly coupling transmit data to prescribed coefficients.

In the method for decoding a picture according to the present invention, a decoded picture corresponding to the resolution of an output device for outputting the picture is generated by linearly coupling the transmit data to the prescribed coefficients.

In the video processor according to the present invention, the processing means performs one or more processing among the plural processing necessary to encode the picture considering the other processing, and the generation means generates a decoded picture corresponding to the resolution of an output device for outputting the picture by linearly coupling the data obtained as the result of processing by the processing means to the prescribed coefficients.

In the method for processing a picture according to the present invention, one or more processing among the plural processing necessary to encode the picture is performed considering the other processing, and a decoded picture corresponding to the resolution of an output device for outputting the picture is generated by linearly coupling thus obtained data to the prescribed coefficients.

BEST MODE FOR CARRYING OUT THE INVENTION

An embodiment of the present invention will be described in detail with reference to the accompanying drawings.

Figure 1:
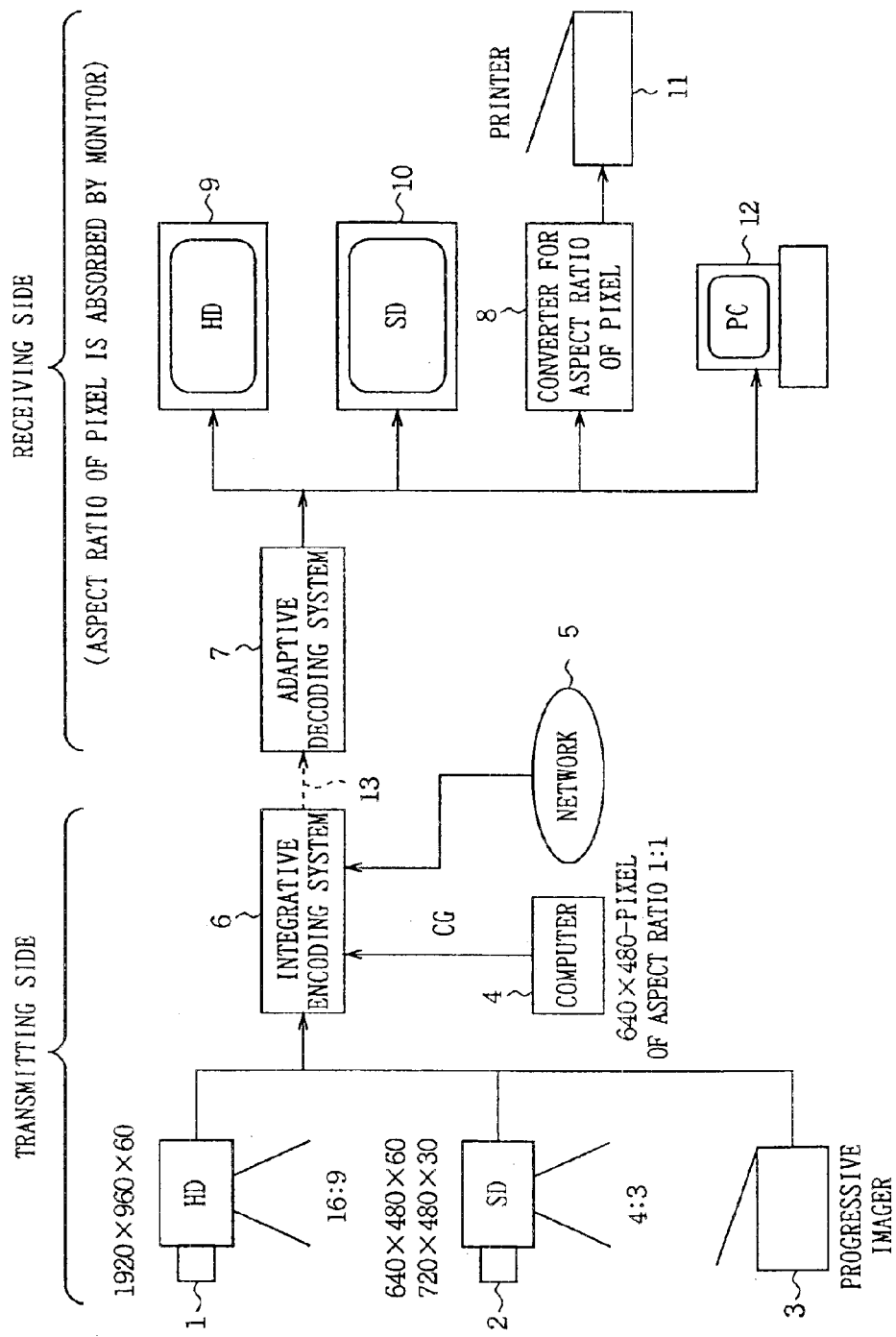
FIG. 1 is a block diagram showing an embodiment of a video transmission system in which the present invention is applied.

FIG. 1 shows a structural example of the embodiment of video transmission system in which the present invention is applied.

On its transmitting side, pictures composed of the maximum number of pixels capable of being outputted by an extended definition video camera 1, a video camera 2 in low definition, etc., are outputted from them. Specifically, for example, a progressive HD picture which is composed of 1920×960 pixels, and of which the aspect ratio is 16:9 and the frame rate is approximately 30 frame/sec, is outputted from the video camera 1. And for example, a progressive SD picture which is composed of 640×480 pixels, and of which the aspect ratio is 4:3 and the frame rate is approximately 30 frame/sec, or a progressive SD picture which is composed of 720×480 pixels, and of which the aspect ratio is the 4:3 and the frame rate is approximately 15 frame/sec is outputted from the video camera 2.

On its receiving side, a progressive imager 3 scans an object and outputs for example, a progressive picture of which the longitudinal number of pixels is integral times of 480. And a computer 4 generates and outputs for example, a picture which is composed of 640×480 pixels and of which a ratio in horizontal to longitudinal is 1:1, as computer graphics (CG).

Such pictures outputted by the video cameras 1 and 2, progressive imager 3 and computer 4 are supplied to an integrative encoding system 6 (the processing means).

In addition, for example, a progressive picture of which the longitudinal number of pixels is integral times of 480 is supplied from a network 5, e.g., an internet or the like, to the integrative encoding system 6. From the network 5, a picture of which the ratio in horizontal to longitudinal of each pixel is 1:1 is supplied similarly to the computer 4.

Here, the video cameras 1 and 2 are made to output the pictures composed of the maximum number of pixels capable of being outputted by them, because if aiming at such pictures for the processing, decoded pictures superior in image quality can be generally obtained comparing with the case of aiming at pictures having less number of pixels in one picture, e.g., pictures in an interlace system.

Moreover, all the longitudinal number of pixels of the pictures to be supplied to the integrative encoding system 6 is the prescribed value, i.e., integral times of 480 here for example. And their frame rate is also the prescribed value, integral times of 15. This is because when an SD picture is generated by thinning out the pixels forming an HD picture in the spatial direction or temporal direction or when an HD picture is generated by interpolating the pixels forming an SD picture in the spatial direction or temporal direction, the deterioration in the image quality of the SD picture or HD picture to be generated can be reduced.

Figure 16:
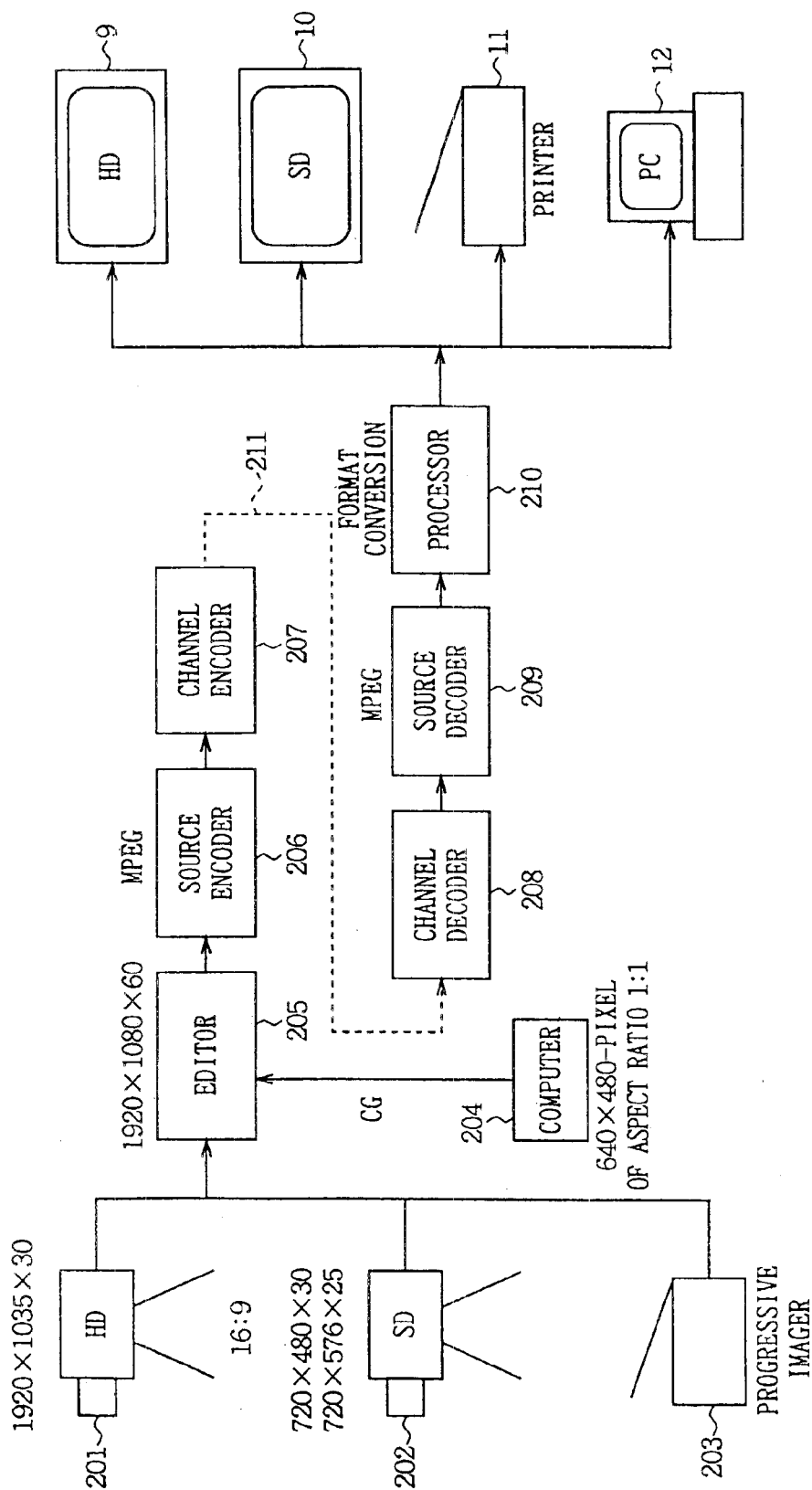
FIG. 16 is a block diagram showing a structural example of video transmission system for transmitting a picture from its transmitting side to receiving side.

The longitudinal number of pixels of the HD picture to be outputted to the video camera 1 is set as 960 pixels, because when the longitudinal number of pixels is integral times of 480, "960" most approximates to "1035" being the longitudinal number of pixels of existing HD pictures (FIG. 16), and thus, the deterioration in its image quality can be reduced when in performing crossing over.

The longitudinal number of pixels of the SD picture to be outputted to the video camera 2 is set as 480 pixels, because that value is the integral number of 480 most approximate to the number of pixels adopted in the present NTSC system or PAL system or the like.

If the horizontal number of pixels of the SD picture of which the aspect ratio is 4:3 to be outputted to the video camera 2 is set to 640, the ratio in horizontal to longitudinal of the pixel becomes 1:1 (=4×480:3×640). As a result, compatibility with the picture to be outputted by the computer 4 or the picture to be supplied from the network 5 is apt to be obtained.

If the horizontal number of pixels of the SD picture of which the aspect ratio is 4:3 to be outputted to the video camera 2 is set to 720, the ratio in horizontal to longitudinal of the pixel becomes 8:9 (=4×480:3×720). This is equal to the ratio in horizontal to vertical (8:9=16×960:9×1920) of the pixels that form the HD picture to be outputted by the video camera 1. Therefore, in this case, if the horizontal and vertical numbers of pixels of the SD picture to be outputted by the video camera 2 are doubled and the longitudinal number of pixels is set to 960 pixels that is equal to the longitudinal number of pixels of the HD picture to be outputted by the video camera 1, quasi roundness can be kept (that is, the pictures can avoid being long in the horizontal direction or the vertical direction).

In the integrative encoding system 6, one or more processing necessary for its encoding, e.g., editing processing, compression pressing, channel coding processing or the like, are performed on pictures (digital video signals) supplied thereto considering the other processing. Here, the editing processing includes not only quasi video editing processing in which cut editing is performed or effects are given but also adding information to realize an integrated services digital broadcasting (ISDB: it is interactive broadcasting that digitalizes and transmits various information) and information to attach other values added (for example, information necessary to obtain a decoded picture in further high image quality), and linking a certain picture to another picture, and the like, for example.

Transmit data obtained by the processing in the integrative encoding system 6 is transmitted to the receiving side via a transmission line 13. As the transmission line 13, other than communication lines such as a satellite line, terrestrial wave, CATV network, public network, internet, etc., the process of magnetic recording/reproducing and also recording mediums such as a magnetic disk, optical disk, magnetic tape, magneto-optical disk, and other recording mediums are included.

The transmit data transmitted via the transmission line 13 is received on the receiving side and supplied to an adaptive decoding system 7 (the generation means). The adaptive decoding system 7 is connected to output devices for outputting a picture, e.g., a high definition display unit 9 for displaying the HD picture, a display unit 10 in standard definition or low definition for displaying the SD picture, a printer 11 for printing out a picture, and a computer display 12 connected to a computer (however, the printer 11 is connected via a converter for aspect ratio of pixel 8). The adaptive decoding system 7 generates decoded pictures corresponding to the respective resolution of the display units 9 and 10, printer 11 and computer display 12 and outputting these pictures to them respectively, by linearly coupling the transmit data to the prescribed coefficients.

In the display units 9 and 10 and the computer display 12, the decoded picture from the adaptive decoding system 7 is displayed, and in the printer 11 the decoded picture from the adaptive decoding system 7 is printed out.

Note that, the difference between the ratio in horizontal to longitudinal of each pixel in the display units 9 and 10 and the computer display 12 (hereinafter, it is preferably referred to as aspect ratio of pixel) and the aspect ratio of pixel forming the decoded picture is absorbed by horizontal scanning in each of the display units 9 and 10 and the computer display 12.

On the other hand, in the printer 11, since the difference of the aspect ratio of pixel cannot be absorbed by such horizontal scanning, the converter for aspect ratio of pixel 8 is provided in the preceding stage. There the aspect ratio of pixel of the decoded picture is converted into a value applicable to the printer 11.

Then, processing in the integrative encoding system 6 will be described.

In the integrative encoding system 6, for example, the compression processing is performed considering the editing processing.

In the integrative encoding system 6, an adaptive dynamic range coding (ADRC) processing is performed as the compression processing, for example.

Here, the ADRC processing will be described briefly.

Figure 2:
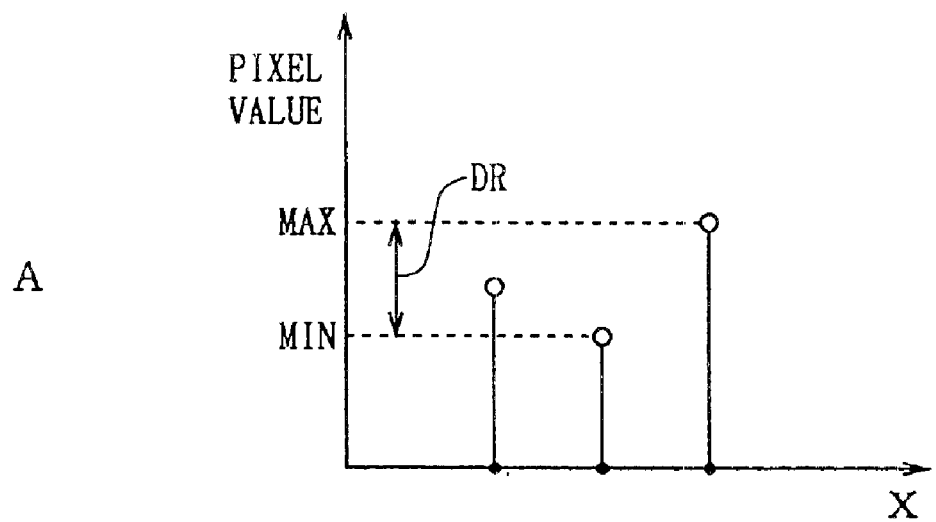
FIGS. 2A and 2B are diagrams explaining the ADRC processing.
Figure 2:
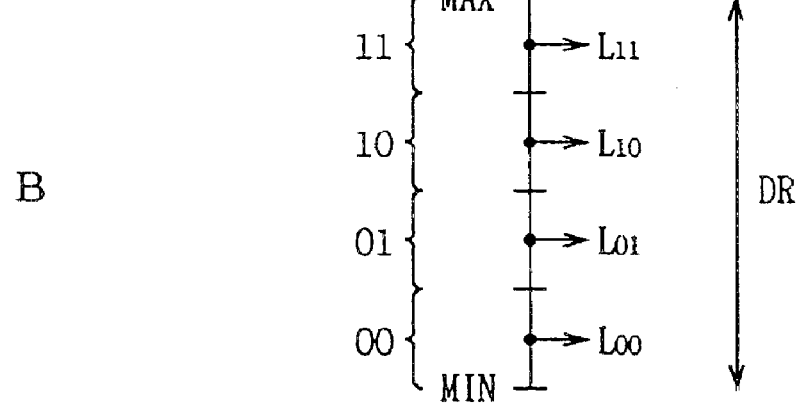

To simplify the description, if considering a block composed of four pixels in line, in the ADRC processing, the maximum value MAX and the minimum value MIN of their pixel values are detected as shown in FIG. 2A. And DR=MAX−MIN is set as the local dynamic range of the block, and the pixel values of the pixels forming the block are requantized into K bit.

Specifically, the minimum value MIN is subtracted from each pixel value in the block. The subtracted values are divided into $DR/2^K$. And the pixel values are converted into codes (ADRC codes) corresponding to thus obtained divided values. More specifically, if assuming K=2 for example, it is determined that the divided values belong to which range among ranges obtained by dividing the dynamic range DR into four ($=2^2$) as shown in FIG. 2B. If the divided value belongs to the range of, e.g., the lowest level, the second level from low, the third level from low, or the top level, it is coded into two bits, e.g., 00B, 01B, 10B or 11B (B shows a binary number).

In the ADRC, a smaller value than the number of bits assigned to the pixel is used as the number of bits K at the time of requantizing. Therefore, each pixel is compressed into such small number of bits (however, the minimum value MIN and the dynamic range DR are generated for each block other than that).

Note that, its decoding can be performed by converting the ADRC code 00B, 01B, 10B or 11B into, e.g., the central value $L_{00}$ of the lowest level range obtained by dividing the dynamic range DR into four, the central value $L_{01}$ of the second level range from low, the central value $L_{10}$ of the third level range from low or the central value $L_{11}$ of the top level range, and adding the minimum value MIN to the value.

Figure 3:
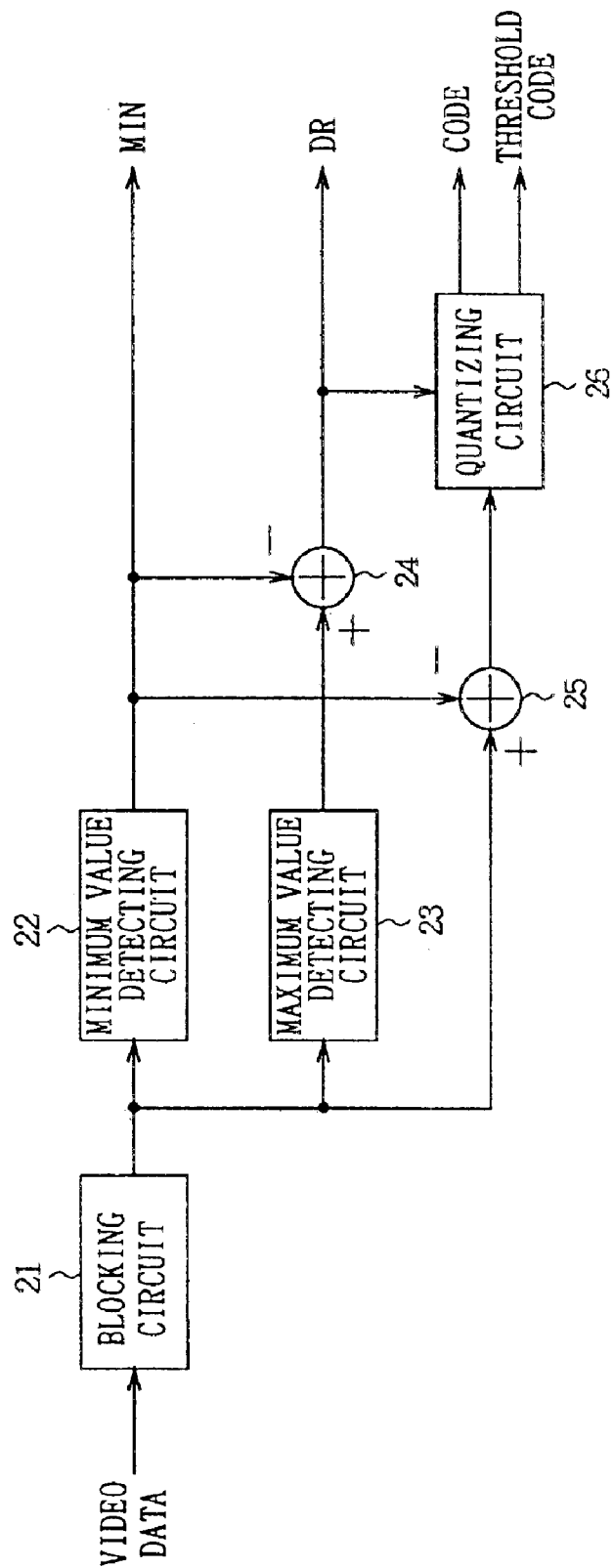
FIG. 3 is a block diagram showing a structural example of ADRC processing circuit.

FIG. 3 shows a structural example of ADRC processing circuit that performs the ADRC processing.

Video data is supplied to a blocking circuit 21 and divided there into blocks in prescribed size. That is, the blocking circuit 21 divides the video data into blocks of, e.g., horizontal 4 by longitudinal 4 pixels, and supplies these blocks to a minimum value detecting circuit 22, a maximum value detecting circuit 23 and a computing unit 25.

In the minimum value detecting circuit 22, the minimum value MIN is detected from among 16 (=4×4) pixels forming the block from the blocking circuit 21. This minimum value MIN is outputted as one of the signals obtained by the ADRC processing as well as supplied to a computing unit 24 and the computing unit 25.

At the same time, in the maximum value detecting circuit 23, the maximum value MAX is detected from among 16 pixels forming the block from the blocking circuit 21 and supplied to the computing unit 24.

In the computing unit 24, the minimum value MIN is subtracted from the maximum value MAX to obtain the dynamic range DR of the block. This dynamic range DR is outputted as one of the signals obtained by the ADRC processing as well as supplied to a quantizing circuit 26.

In the computing unit 25, the minimum value MIN of the block is subtracted from each of the 16 pixels forming the block, and the subtracted values are supplied to the quantizing circuit 26. In the quantizing circuit 26, the subtracted values from the computing unit 25 are quantized in a quantization step corresponding to the dynamic range DR from the computing unit 24. That is, in the quantizing circuit 26, for example, the output of the computing unit 25 is divided into $DR/2^K$, and a value which the decimal fractions has omitted is outputted as an ADRC code CODE (requantized result of pixel).

In this embodiment, the number of bits K in requantizing is determined, for example, corresponding to the size of the dynamic range DR of each block and the ADRC code is variable length.

For example, it is assumed that four threshold values T1, T2, T3 and T4 are now set and their size relationship is 0<T1<T2<T3<T4 and also eight bits are assigned to the pixels of an original picture (thus, T4 is less than $2^8$).

In this case, in the quantizing circuit 26, it is determined whether or not the dynamic range DR is within one of 0 or more and less than T1, T1 or more and less than T2, T2 or more and less than T3, T3 or more and less than T4 and T4 or more and less than $2^8$. And if the dynamic range DR is within one of those, for example, 0 through 4 bits are respectively assigned as the number of bits K in requantizing. Therefore, in this case, the ADRC code becomes 0 bit at the minimum and 4 bit at the maximum.

When the ADRC code is variable length, the number of bits K of the ADRC code is necessary for its decoding. Therefore, the quantizing circuit 26 outputs a threshold code showing that the dynamic range DR is within which range among the above ranges. This threshold code is outputted as the result of ADRC processing together with the minimum value MIN, dynamic range DR and ADRC code.

Note that, the minimum value MIN, dynamic range DR and threshold code are set in variable length for example.

In the above case, the ADRC code is set in variable length, however, the ADRC code can be set in fixed length provided that the number of bits K in requantizing is set to a fixed value irrespective of the dynamic range DR of the block.

The ADRC code obtained by the above ADRC processing becomes less than the number of bits assigned to the original pixels. On the other hand, the minimum value MIN, dynamic range DR and ADRC code obtained by the ADRC processing can be used in a block unit, thus the ADRC-processed picture can be edited in a frame unit for example.

From the above, by conducting the ADRC processing as the compression processing and setting the result of the ADRC processing as an object of various editing processing, the almost same editing processing as the case where the original picture before ADRC processing is set an object can be performed, and at the same time, a load of the processing can be reduced comparing with the case where the original picture before ADRC processing is set as the object.

Thus it can be said that the ADRC processing as compression processing is performed considering the editing processing, and the editing processing can be executed efficiently.

The detail of the ADRC has been disclosed in the patent laid-open No. Hei3(1991)-53778 previously filed by the present applicant, or the like, for example.

The ADRC can be referred to as block coding since it performs coding in a block unit. In addition to the ADRC, however, the block coding includes coding which obtains the mean value and the standard deviation of pixels forming a block and also 1-bit flag showing the size relationship between each pixel and the mean value, and the like. Such block coding may be adopted as the compression processing by the integrative encoding system 6.

In the above case, the minimum value MIN and the dynamic rang DR are included in the result of the ADRC processing. In the result of the ADRC, also, the minimum value MIN and the maximum value MAX of the block, or the dynamic range DR and the maximum value MAX of the block can be included in addition to that.

Moreover, in the above case, a block is composed of one frame of horizontal 4 pixel by longitudinal 4 pixel. However, the block can be composed of pixels forming plural frames that temporary continue.

By the way, as a method for transmitting the minimum value MIN, dynamic range DR, threshold code and ADRC code for each block obtained by the ADRC processing, for example, there is a method which forms a block disposes a prescribed amount of data of the ADRC result (hereinafter, it is preferably referred to as sync block) following a synchronization pattern for matching and performing transmission in such sync block unit.

When transmission is performed in a sync block unit, the minimum value MIN, dynamic range DR and threshold code are fixed length as the above. Therefore, if these data are disposed at fixed positions in a sync block, even if one sync block cannot be obtained by failure, it does not affect minimum values MIN, dynamic ranges DR and threshold codes disposed in other sync blocks.

Since the ADRC code is variable length, however, in the case where an ADRC code is separately disposed in plural sync blocks because it cannot be contained in one sync block for example, the failure of the one sync block sometimes affects the other sync blocks. Specifically, if the first sync block has failed among the plural sync blocks, it is unknown that the ADRC code disposed at the top of the second sync block is corresponding to which position's pixel in the block, further it is unknown that the bit disposed as the ADRC code is whether a bit forming the following (a part of) ADRC code disposed at the end of the first sync block or the first bit of the ADRC code. As a result, even an ADRC code disposed in a sync block after the second cannot be fetched. As the above, a certain sync block error propagates to the other sync blocks.

By the way, even if all the ADRC codes of a certain block has lost, if the minimum value MIN has known, the block in which all the pixels have the minimum value MIN as a pixel value can be reproduced. However, since this block has the same pixel value, practically flat, the reproducibility of the original picture is low.

To realize its further higher reproducibility, it can be considered that the ADRC code is separated into, for example, the most significant bit (MSB) and others (hereinafter, it is preferably referred to as remaining bits) and disposing also the MSB at a fixed position in the sync block similarly to the minimum value MIN, dynamic range DR and threshold code. In this case, even if the remaining bit has lost, the block formed of binary can be obtained by inversely quantizing the MSB based on the dynamic rang DR. Thus, the picture with higher reproducibility can be obtained comparing with the case where all the ADRC codes have lost.

Figure 4:
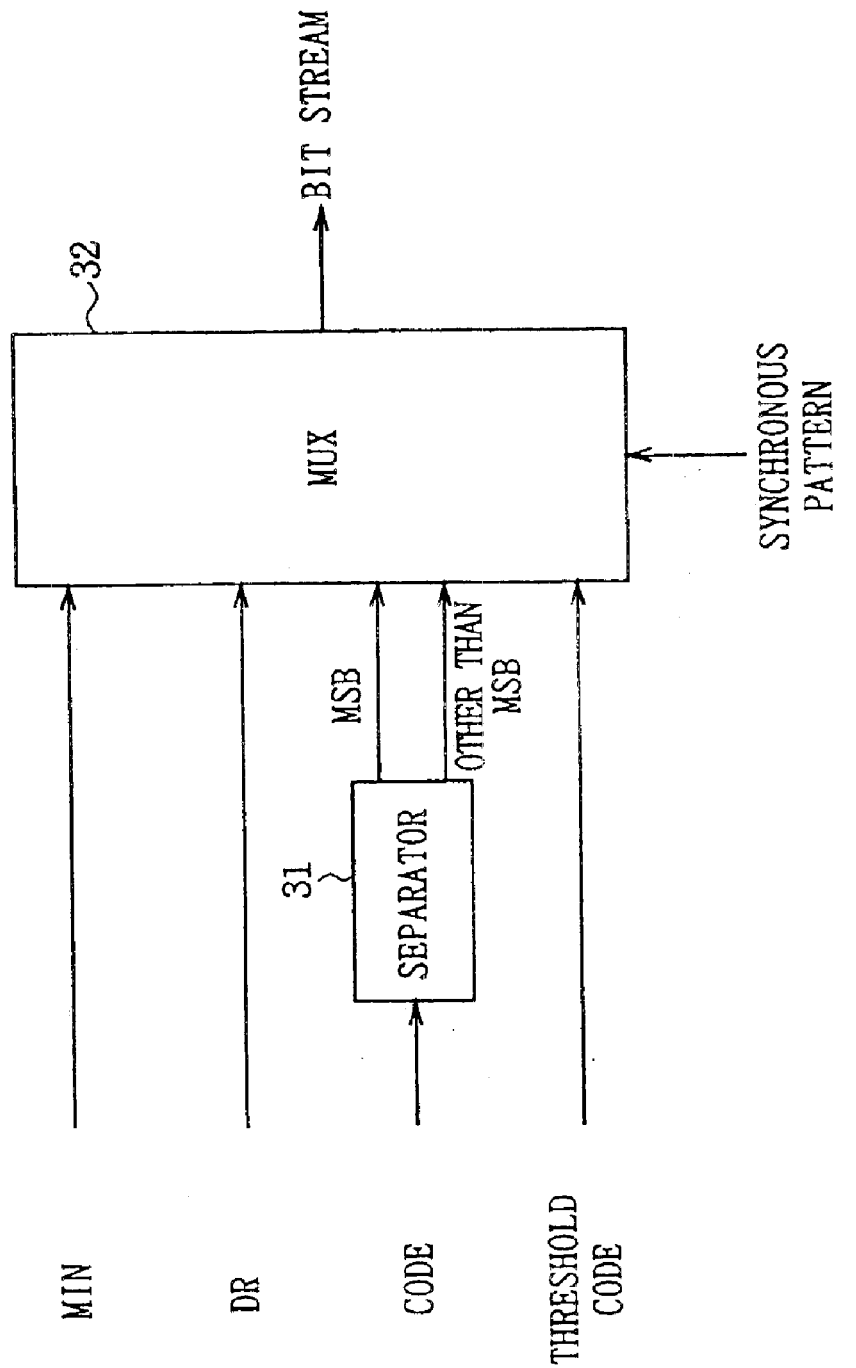
FIG. 4 is a block diagram showing a structural example of sync block forming circuit.

FIG. 4 shows a structural example of sync block forming circuit that performs sync block processing to form the above sync block.

The minimum value MIN, dynamic range DR and threshold code outputted from the ADRC processing circuit (FIG. 3) are supplied to a multiplexer 32 and the ADRC code CODE is supplied to a separator 31. In the separator 31, the ADRC code is separated into the MSB and the remaining bits and both are supplied to the multiplexer 32.

The synchronization pattern has supplied to the multiplexer 32 in addition to the above data. The multiplexer 32 performs time division multiplexing on the data supplied thereto and forms and outputs a sync block such as shown in FIG. 5.

Figure 5:
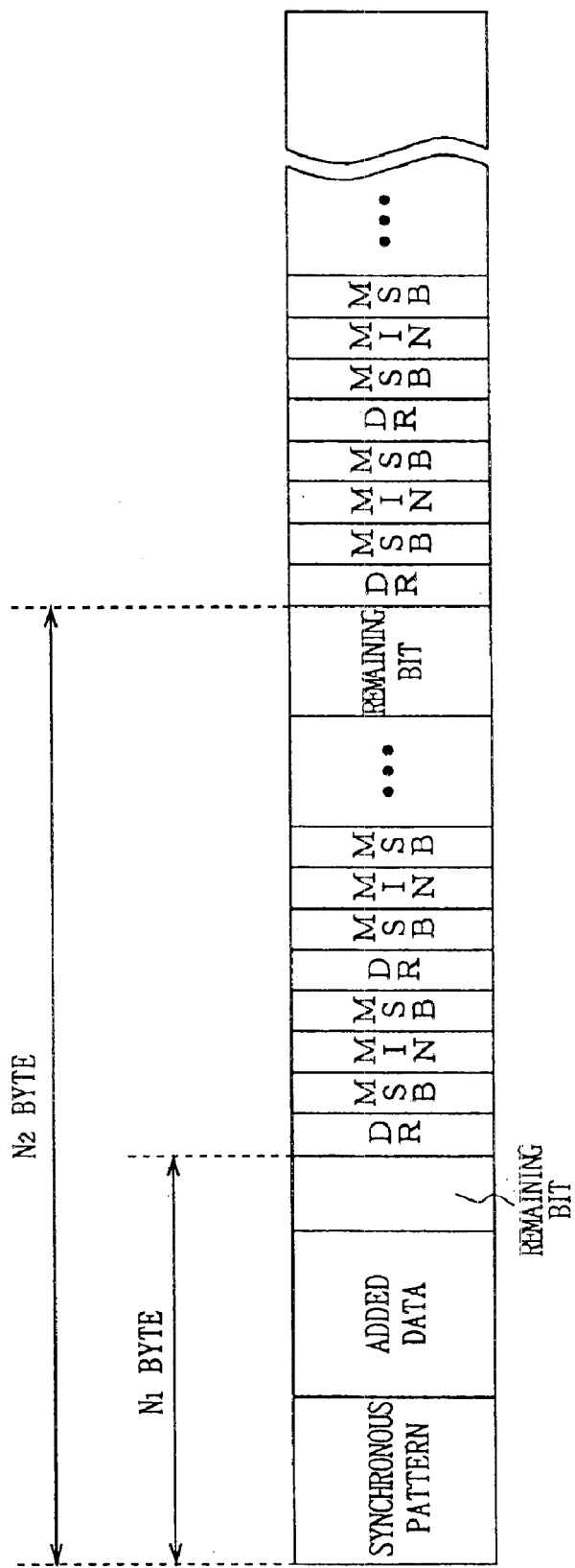
FIG. 5 is a diagram showing the format of a sync block.

That is, as shown in FIG. 5, the synchronization pattern having a fixed length is disposed at the top of the sync block, and added data having a fixed length is disposed following it. Here, the added data is formed only fixed length data such as the threshold code or the like. Following the added data, the remaining bits are disposed by a prescribed number of bytes, that is, after the added data, the remaining bits are disposed from the head to an $N_1$-1-th byte.

The dynamic range DR, MSB and minimum value MIN are disposed after from the top to an $N_1$-th byte in the order of DR, MSB, MIN, MSB, DR, . . . , for example. Following the prescribed number of the disposed dynamic range DR, MSB and minimum value MIN, the remaining bits are disposed again. Then, after an $N_2$-th byte from the top, the prescribed number of the dynamic range DR, MSB and minimum value MIN are disposed again in the aforementioned order. Hereinafter, the similar disposition is repeated until the end of the sync block.

Since the dynamic range DR, the MSB and the minimum value MIN are disposed from the determined position as from the $N_1$-th byte , $N_2$-th byte, . . . from the head of the sync block as the above and these data are fixed length, they are disposed at the fixed position in the sync block.

In the above sync block processing, even if an error is caused in the ADRC code (remaining bits), a decoded picture comparatively close to the original picture can be obtained. Furthermore, even if no bit remains, a decoded picture in high reproducibility can be obtained. Thus, extremely to say, it is unnecessary to add an ECC for error correction to the remaining bits, for example. In this case, a load against channel coding processing can be reduced. For this reason, it can be said that the sync block processing is performed considering channel coding processing.

Note that, the detail of the sync block processing has been disclosed in the patent laid-open No. 2(1990)-162980 previously filed by the present applicant or the like.

The integrative encoding system 6 can also perform hierarchical coding processing as the compression processing in place of the ADRC processing, for example.

In the hierarchical coding, for example, high resolution picture data is set as the picture data of the lowest hierarchy or the first hierarchy, and the picture data of the second hierarchy (compressed picture) of which the number of pixels is less than the first hierarchy's is generated and the picture data of the third hierarchy of which the number of pixels is less than the second hierarchy's is generated. Similarly, picture data are generated until the most upper hierarchy. The picture data of each hierarchy is displayed on a monitor having a resolution (the number of pixels) corresponding to the hierarchy. Thus, on a user side, a picture of the same contents can be viewed by selecting picture data corresponding to the resolution of his monitor from among the hierarchically-coded picture data.

By the way, in the case where picture data having a certain resolution is set as the picture data of the lowest hierarchy (first hierarchy) and the picture data of an upper hierarchy is sequentially formed and all of them are stored or transmitted as they are, much storage capacity or transmission capacity is required by the picture data of the upper hierarchy comparing with the case of storing only the picture data of the lowest hierarchy.

For that reason, here, a hierarchical coding without such increasing of storage capacity or the like is adopted as the compression processing in the integrative encoding system 6.

For example, now the mean value of four pixels, 2×2 (horizontal by vertical) pixels in a lower hierarchy is set as the pixels (pixel value) of an upper hierarchy, and performing hierarchical coding in three hierarchies. In this case, considering 8×8 pixel as the picture of the lowest hierarchy as shown in FIG. 6A, the mean value m0 of four pixels h00, h01, h02 and h03 at the upper left of the second hierarchy is operated and set as the one pixel of the upper left of the second hierarchy. Similarly, the mean value m1 of four pixels h10, h11, h12 and h13 at the upper right of the picture of the lowest hierarchy, the mean value m2 of four pixels h20, h21, h22 and h23 at the lower left and the mean value m3 of four pixels h30, h31, h32 and h33 at the lower right are operated and set as the one pixel at the upper right, lower left and lower right of the second hierarchy respectively. Furthermore, the mean value (q) of 2×2 pixels of the second hierarchy, the four pixels m0, m1, m2 and m3, is operated and set as the pixel of the picture of the third hierarchy, i.e., the most upper hierarchy, here.

If all the above pixels h00 to h03, h10 to h13, h20 to h23, h30 to h33, m0 to m3 and (q) are stored as they are, much storage capacity or the like is required by the pixels m0 to m3 and (q) as described above.

Then, as shown in FIG. 6B, the pixel (q) of the third hierarchy is disposed at, e.g., the position of the pixel m3 at the lower right among the pixels m0 to m3 of the second hierarchy. Thus, the second hierarchy is composed of the pixels m0 to m2 and (q).

As shown in FIG. 6C, the pixel m0 of the second hierarchy is disposed at, e.g., the position of the pixel h03 at the lower right, among the pixels h00 to h03 of the third hierarchy that has used to obtain m0. Similarly, the remaining pixels m1, m2 and (q) of the second hierarchy are disposed in place of the pixels h13, h23 and h33 of the first hierarchy. Note that, the pixel (q) has not obtained directly from the pixels h30 to h33 but since it has been disposed in the second hierarchy in place of m3 obtained directly from them, the pixel (q) is disposed instead of disposing the pixel m3 at the position of the pixel h33.

By conducting as the above, as shown in FIG. 6C, the total of pixels becomes 16 pixel of 4×4. This is the same as the case of only the pixels of the lowest hierarchy shown in FIG. 6A. Therefore, in this case, an increase of storage capacity or the like can be prevented.

In this connection, the decoding of the pixel m3 changed into the pixel (q) and the pixels h03, h13, h23 and h33 changed into the pixels m0 to m3 respectively can be performed as follows.

Since (q) is the mean value of m0 to m3, the equation q=(m0+m1+m2+m3)/4 is satisfied. Thus, m3 can be obtained by the equation m3=4×q−(m0+m1+m2).

Since m0 is the mean value of h00 to h03, the equation m0=(h00+h01+h02+h03)/4 is satisfied. Thus, h03 can be obtained by the quation h03=4×m0−(h00+h01+h02). In similar manner, h13, h23 and h33 can be obtained.

Figure 7:
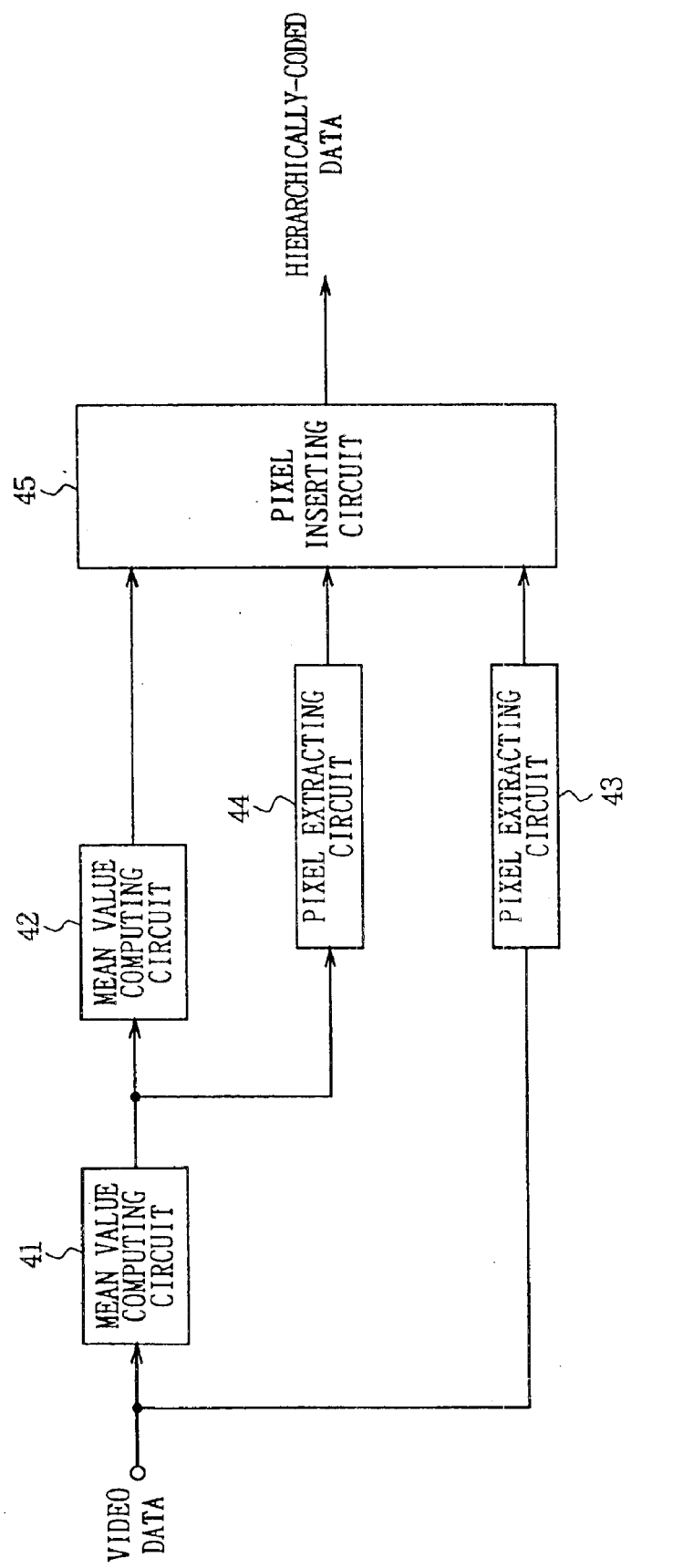
FIG. 7 is a block diagram showing a structural example of hierarchical encoding circuit.

FIG. 7 shows a structural example of hierarchical coding circuit that performs the above hierarchical coding processing. In this hierarchical coding circuit, the aforementioned hierarchical coding in three hierarchies is performed for example.

The first hierarchy (lowest hierarchy) picture data (here, it is progressive picture as described above) is supplied to a mean value calculating circuit 41 and a pixel extracting circuit 43.

In the mean value calculating circuit 41, with respect to the first hierarchy picture, for example, the mean value of 2×2 pixels the total four pixels as the above is computed, and the second hierarchy picture is generated. This second hierarchy picture is supplied to a mean value calculating circuit 42 and a pixel extracting circuit 44.

In the mean value calculating circuit 42, with respect to the second hierarchy picture, for example, the mean value of 2×2 pixels the total four pixels is computed, and the third hierarchy picture is generated. This third hierarchy picture is supplied to a pixel inserting circuit 45.

Figure 6:
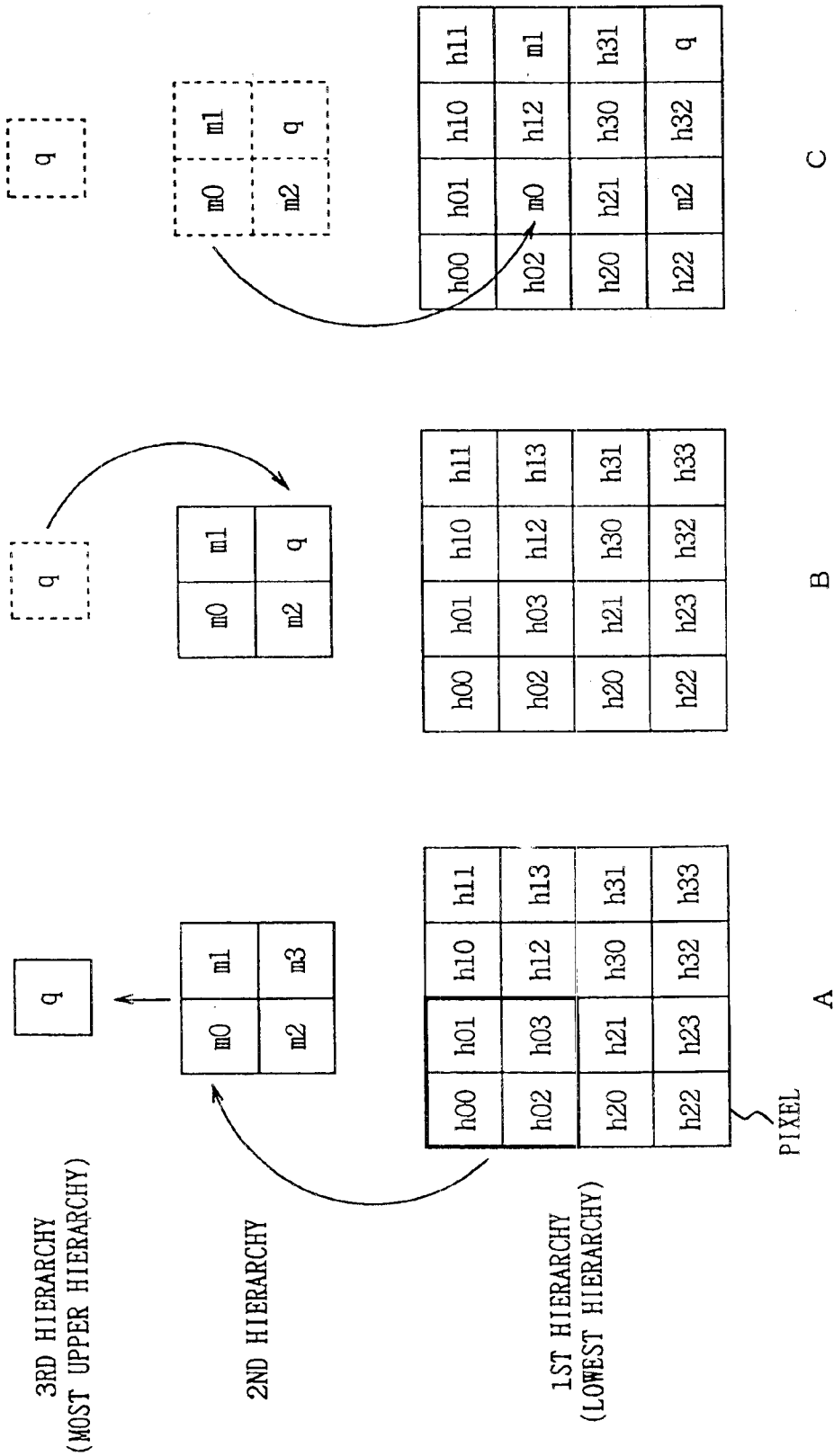
FIGS. 6A to 6C are diagrams explaining hierarchical coding.

In the pixel extracting circuit 43, pixels which correspond to the pixels h03, h13 and h23 described in FIG. 6 are extracted from the first hierarchy picture and the remains are supplied to the pixel inserting circuit 45. In the pixel extracting circuit 44, pixels which correspond to the pixel m3 described in FIG. 6 is extracted and the remains are supplied to the pixel inserting circuit 45.

In the pixel inserting circuit 45, the pixels of the second hierarchy picture (e.g., the pixels m0 to m2) from the pixel extracting circuit 44 are inserted to positions corresponding to the pixels h03, h13 and h23 of the first hierarchy picture from the pixel extracting circuit 43, and the pixel of the third hierarchy picture (e.g., pixel (q)) from the mean value calculating circuit 42 is inserted to a position corresponding to the pixel h33 of the first hierarchy picture. In the above manner, the picture data described in FIG. 6C is formed and this is outputted as the result of the hierarchical coding.

If according to normal hierarchical coding, much storage capacity or transmission capacity is required by the picture data of upper hierarchies, however, according to the hierarchical coding described in FIGS. 6 and 7 (hereinafter, it is preferably referred to as improved hierarchical coding), the amount of data to be obtained as the result is the same as the picture of the lowest hierarchy. For this reason, the improved hierarchical coding can be said to be information compressing processing.

When the hierarchical coding is performed, the picture of a lower hierarchy can be obtained by performing, for example, interpolation or the like using an upper hierarchy picture (however, thus obtained picture is not the same picture as the lower hierarchy picture but a picture deteriorated in image quality.) Therefore, even in the worst, the pictures of all the hierarchies can be obtained provided that the picture of the most upper hierarchy can be restored, so that, for example, the addition of an ECC for error correction is sufficient only performing to the picture of the most upper hierarchy and it is unnecessary to perform to the pictures of all the hierarchies. In this case a load to channel coding processing can be reduced. For this reason, it can be said that the hierarchical coding processing is performed considering the channel coding.

Note that, in the above case, the upper hierarchy picture is generated with reducing the number of pixels in the spatial direction, but the upper hierarchy picture can be generated with reducing the number of pixels in the temporal direction for example.

Then, it will be described about the addition of information for realizing an ISDB, one of the editing processing in the integrative encoding system 6.

Figure 8:
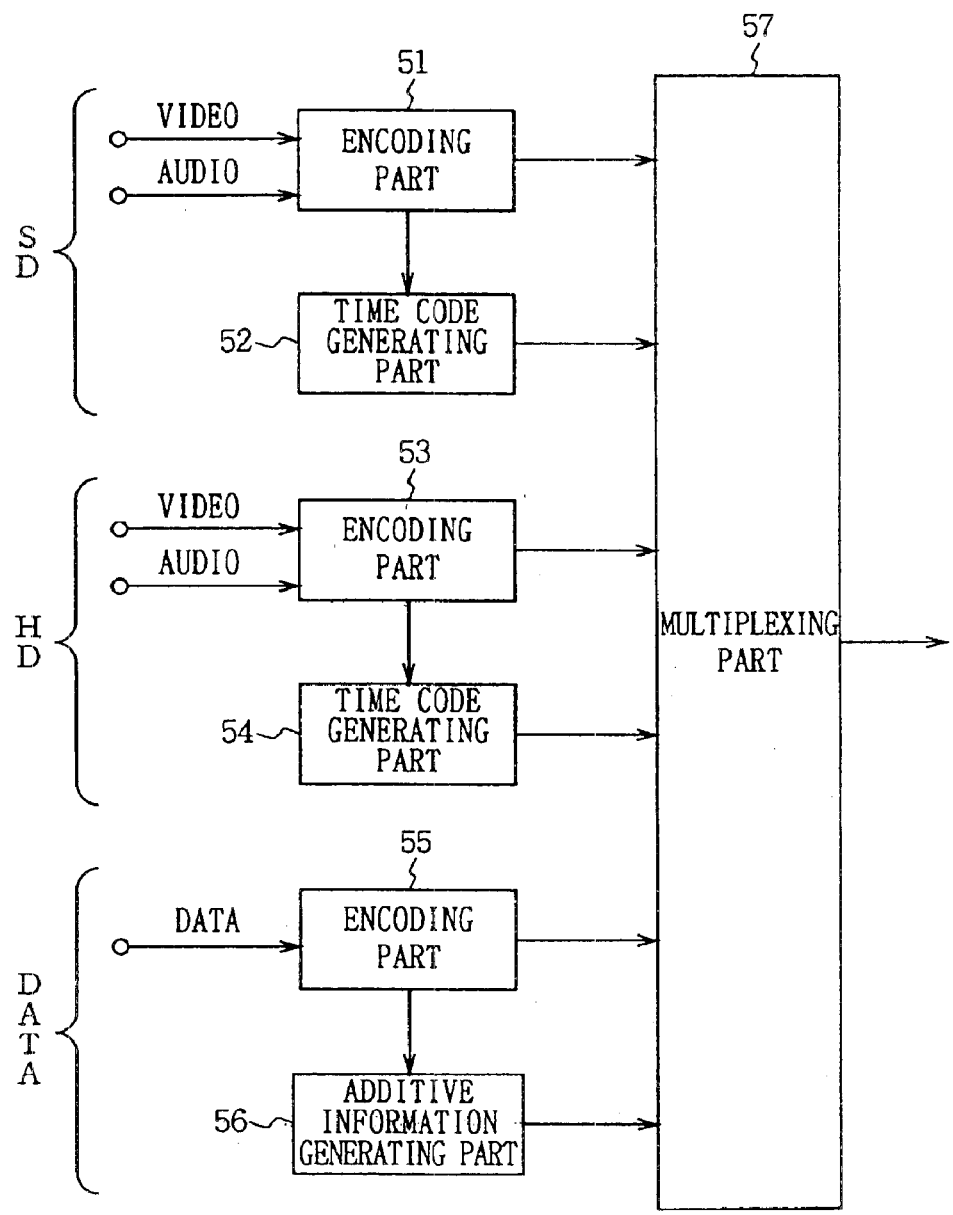
FIG. 8 is a block diagram showing a structural example of ISDB transmitter.

FIG. 8 shows a structural example of ISDB transmitter being a part of the integrative encoding system 6 that realizes the ISDB.

For example, an SD picture and audio attached thereto are inputted to an encoding part 51, and they are subjected there to the compression processing as the aforementioned ADRC processing. Thus obtained signal is outputted to a multiplexing part 57. Furthermore, the encoding part 51 outputs a synchronizing signal which represents the timing of the compression processing to a time code generating part 52. The time code generating part 52 generates a time code or the like as additive information to be added to the output of the encoding part 51 synchronizing with the synchronizing signal from the encoding part 51 and outputs this to the multiplexing part 57.

Also in an encoding part 53 or a time code generating part 54, the processing similar to the encoding part 51 or the time code generating part 52, except for that an object of the processing is not SD picture but HD picture, is performed respectively. Both of the coded data obtained by the compression processing in the encoding part 51 and the time code outputted by the time code generating part 54 are supplied to the multiplexing part 57.

To an encoding part 55, for example, a computer program, data necessary to execute the program, facsimile data and also data for realizing multimedia such as local information are inputted. These data are compressed there and outputted to the multiplexing part 57 as coded data. Furthermore, the encoding part 55 outputs the synchronizing signal which represents the timing of the compression processing to an additive information generating part 56. The additive information generating part 56 generates additive information which represents a type of the data compressed in the encoding part 55, synchronizing with the synchronizing signal from the encoding part 55 and outputs this to the multiplexing part 57.

Here, the local information to be inputted to the encoding part 55 is information peculiar to each area, and it includes, for example, a weather forecast, map, information on establishments (e.g., the service contents and business hours of restaurants, etc.) and advertisements in each area. With respect to such local information, the additive information generating part 56 generates an area code which represents an area corresponding to each local information as added information.

In the multiplexing part 57, the outputs of the encoding part 51, time code generating part 52, encoding part 53, time code generating part 54, encoding part 55 and additive information generating part 56 are multiplexed and outputted.

Figure 9:
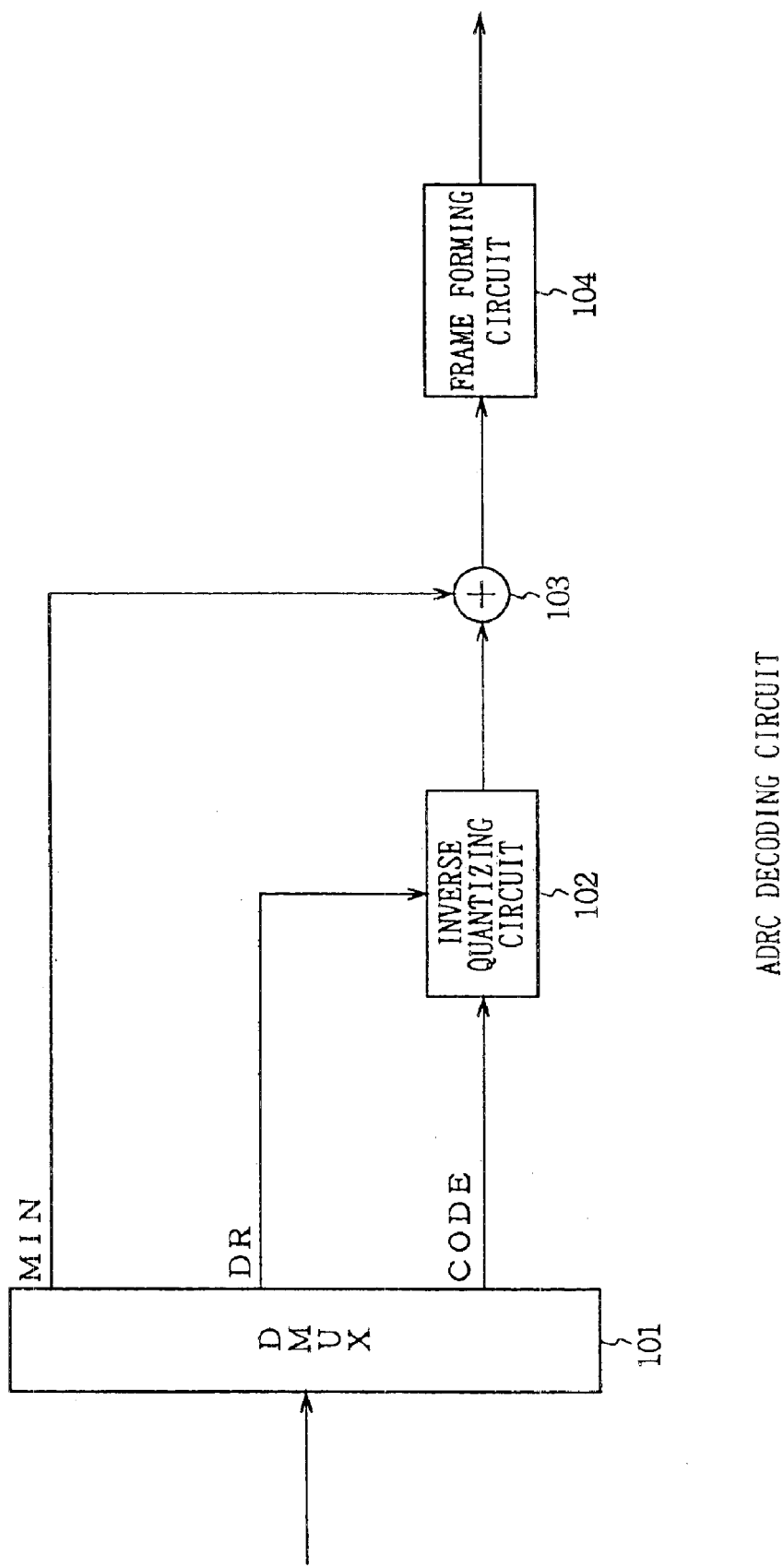
FIG. 9 is a block diagram showing a structural example of ADRC decoding circuit.

Then, FIG. 9 shows a structural example of the adaptive decoding system 7 (FIG. 1) in the case where the ADRC processing is performed as the compression processing in the integrative encoding system 6. That is, FIG. 9 shows a structural example of ADRC decoding circuit being a part of the adaptive decoding system 7 that performs ADRC decoding processing when the result of the ADRC processing is decoded.

To a demultiplexer 101, a bit stream in which the result of the ADRC processing is disposed is inputted as transmit data transmitted via the transmission line 13 (FIG. 1), and there the minimum value MIN, dynamic range DR and ADRC code are separated from the transmit data. Note that, in the demultiplexer 101, the separation of the ADRC code is performed by separating the threshold code from the transmit data and recognizing the number of assigned bits to the ADRC code (the above K) based on the threshold code.

The minimum value MIN is supplied to an arithmetic unit 103, and the dynamic range DR and the ADRC code are supplied to an inverse quantizing circuit 102, respectively. In the inverse quantizing circuit 102, the ADRC code is inversely quantized in a quantization step corresponding to the dynamic range DR, and thus obtained inversely-quantized value is supplied to the arithmetic unit 103. In the arithmetic unit 103, the inversely-quantized value from the inverse quantizing circuit 102 is added to the minimum value MIN. Thereby, the pixels are decoded.

If obtaining a pixel for one block, the arithmetic unit 103 supplies this to a frame forming circuit 104. The frame forming circuit 104 sequentially stores the pixels which have supplied in a block unit and outputting them every storing of it.

In the case where the ADRC code has separated into the MSB and the remaining bits as described above, the demultiplexer 101 also performs processing for storing the original ADRC code by combining the MSB with the remaining bits. Furthermore, in the case where the ADRC code has separated into the MSB and the remaining bits, if an error has occurred in the remaining bits, the demultiplexer 101 outputs the MSB to the inverse quantizing circuit 102 as the ADRC code.

By the way, in the ADRC decoding, even if the remaining bits are in error, if the MSB, minimum value MIN and dynamic range DR exist, a decoded picture having fine reproducibility in a certain degree (decoded picture similar to the original picture) can be obtained, as described above. However, if the minimum value MIN or the dynamic range DR is in error, it becomes difficult to decode the block.

Figure 10:
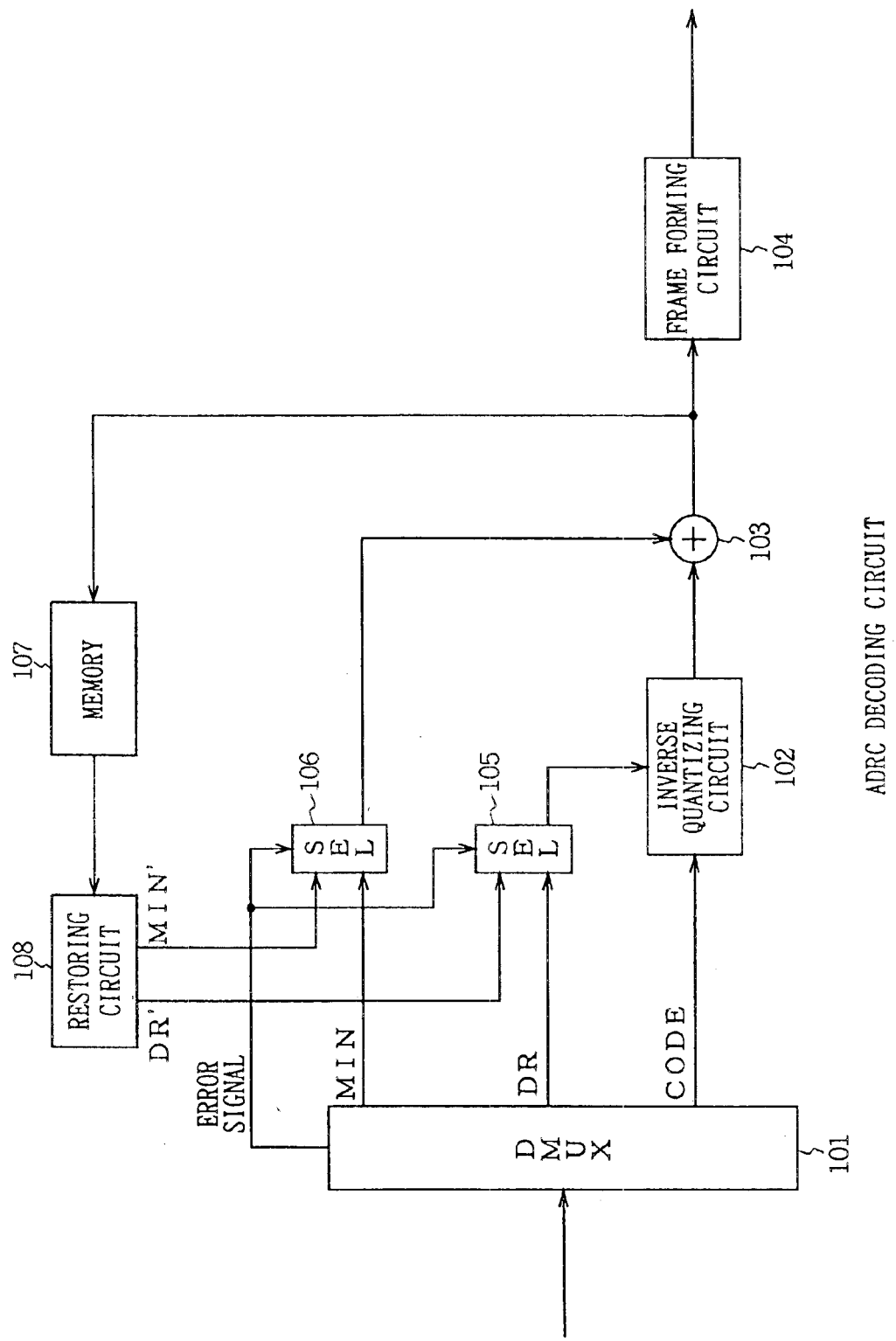
FIG. 10 is a block diagram showing another structural example of ADRC decoding circuit.

FIG. 10 shows a structural example of ADRC decoding circuit capable of decoding a block with relatively fine precision even if the minimum value MIN or the dynamic range DR is in error. Note that, in FIG. 10, the same reference numerals are added to corresponding parts of FIG. 9, and its description will be omitted hereinafter. That is, this ADRC decoding circuit is basically similarly configured to FIG. 9 except that selectors 105 and 106, a memory 107 and a restoring circuit 108 are newly provided.

To the selector 105, the dynamic range DR outputted by the demultiplexer 101 and a predicted value of the dynamic range DR' outputted by the restoring circuit 108 are supplied. To the selector 106, the minimum value MIN outputted by the demultiplexer 101 and a predicted value of the minimum value MIN' outputted by the restoring circuit 108 are supplied. The demultiplexer 101 here detects whether an error is occurred in the minimum value MIN and the dynamic range DR included in the transmit data, and if an error is caused, it outputs an error signal to the selectors 105 and 106.

The selector 105, when not receiving the error signal, that is, no error is caused in the minimum value MIN and the dynamic range DR, selects the dynamic range DR outputted by the demultiplexer 101 and outputs this to the inverse quantizing circuit 102. Similarly, the selector 106, when not receiving the error signal, selects the minimum value MIN outputted by the demultiplexer 101 and outputs this to the arithmetic unit 103.

Therefore, in this case, the ADRC decoding processing is performed similar to the case of FIG. 9.

On the other hand, the decoded values of the pixels outputted by the arithmetic unit 103 are supplied to not only the frame forming circuit 104 but also the memory 107. In the memory 107, the decoded values of the pixels from the arithmetic unit 103 are stored in each corresponding address.

Then, in the restoring circuit 108, the decoded values of pixels in the circumference of a block now being an object of the ADRC decoding processing are read out from the memory 107 by the same number as the number of pixels forming a block, that is, 16 pieces in this embodiment as described above. Furthermore, the restoring circuit 108 detects the minimum value and the dynamic range (difference between the maximum value and the minimum value) of that sixteen pixels, and outputs each of them to the selectors 106 and 105 respectively as the predicted value of the minimum value MIN' and the predicted value DR' of the dynamic range of the block now being the object of the ADRC decoding.

The selector 105 or 106, if receiving the error signal from the demultiplexer 101, that is, an error is caused in the minimum value MIN or the dynamic range DR, selects the predicted value of the dynamic range DR' or the predicted value of the minimum value MIN' from the restoring circuit 108, and outputs them to the inverse quantizing circuit 102 or the arithmetic unit 103 respectively.

Thus, in this case, in the inverse quantizing circuit 102, inverse quantization is performed using the predicted value of the dynamic range DR', and in the arithmetic unit 103, the pixels are decoded using the predicted value of the minimum value MIN'.

Marking a certain block, normally a large relationship exists between pixels forming the marked block and pixels in the circumference of the marked block. Therefore, according to the pixels having such correlation, the dynamic range and the minimum value of the marked block can be predicted in relatively fine precision. As a result, using thus predicted values enable to obtain a decoded picture almost similar to the case of using the true minimum value MIN and dynamic range DR.

The detail of the above ADRC decoding processing has been disclosed in the patent laid-open No. S63(1988)-257390 previously filed by the present applicant, for example.

When the ADRC processing is performed, even if an error has caused in the minimum value MIN or the dynamic range DR a decoded picture in a certain degree can be obtained as described above. Moreover, by performing sync block processing in addition to the ADRC processing, to cope with an error in the remaining bits is enabled as described above. Furthermore, also in the case of performing hierarchical coding, it is sufficient to perform the processing for error correction to the picture of the most upper hierarchy at least as described above, and it is not required to always perform the processing to the pictures of all the hierarchies.

For this reason, the ADRC processing, sync block processing and hierarchical coding processing can be said that quasi robust processing strongly resistant to errors. Now if such robust processing having resistance to errors is assumed as robust coding, the processing performed in the integrative encoding system 6 can be said integrative coding processing in which such robust coding and editing processing and the like are integrated.

Among the robust coding, for example, in the ADRC processing, an amount of information is reduced and also a resistance to errors is improved by its execution. Therefore it can be said that in the ADRC processing, the compression processing of pictures and the processing for error correction are performed by organically combined.

Figure 11:
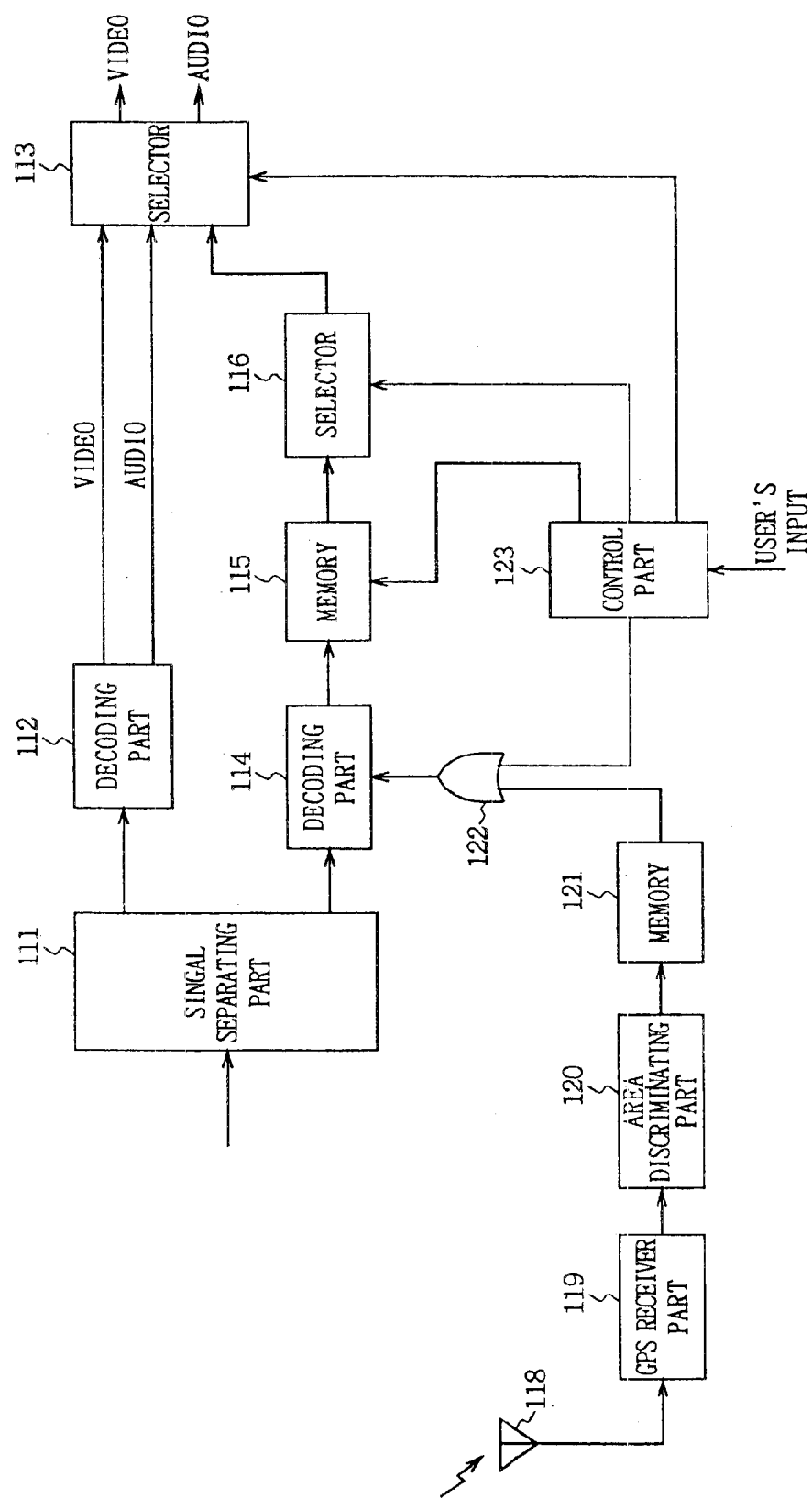
FIG. 11 is a block diagram showing a structural example of ISDB receiver.

Then, FIG. 11 shows a structural example of ISDB receiver being a part of the adaptive decoding system 7 that realizes an ISDB.

To a signal separating part 111, the transmit data transmitted via the transmission line 13 is inputted, and there coded data obtained by coding video (SD picture or HD picture) and audio accompanying with that for example, are extracted from the transmit data. The coded data generated in the signal separating part 111 are outputted to a decoding part 112 respectively.

In the decoding part 112, the coded data from the signal separating part 111 are decoded. That is, ADRC decoding or the like is performed on the coded video data for example. The video and the voice accompanying with that obtained by the decoding processing in the decoding part 112 are outputted via a selector 113. The picture is supplied to the display device 9 or 10 or the computer display 12 and displayed, or supplied to the printer 11 via the converter for aspect ratio of pixel 8 and printed out. On the other hand, the audio is supplied to a speaker (not shown) and outputted.

In the signal separating part 111, the local information and the area code as added information corresponding to the local information are extracted and supplied to a decoding part 114. In the decoding part 114, the local information is decoded corresponding to the area code.

That is, since it is not limited that the received local information is the information on an area desired by the user, only the local information inputted accompanied with the area code corresponding to the area previously inputted is decoded in the decoding part 114.

Inputting an area is able by operating a control part 123 for example. The inputted area information is supplied to the decoding part 114 via an OR gate 122.

Furthermore, the area input is also able using a global positioning system (GPS) system ("system" means that plural devices are logically integrated and it is not referred to whether or not each of devices having individual configuration are contained in the same housing). That is, a radio wave from a GPS satellite is received by an antenna 118, and the received signal is supplied to a GPS receiving part 119. The GPS receiving part 119 calculates the position where the ISDB receiver of FIG. 11 has been installed from the received signal from the antenna 118, and supplies thus obtained position information (for example, its longitude and latitude or the like) to an area discriminating part 120. The area discriminating part 120 discriminates the area from the position information from the GPS receiving part 119, and outputs a code assigned to that area to a memory 121 for storing. The code stored in the memory 121 is supplied to the decoding part 114 via the OR gate 122. In the decoding part 114, only the local information inputted accompanied with the area code agree with that code is decoded.

The local information decoded in the decoding part 114 is supplied to a memory 115 and stored therein. Thus, in the memory 115, only the local information for the area where the user lives in, for example.

When viewing the local information stored in the memory 115, the user operates so the control part 123. The local information is read out from the memory 115 corresponding to the operation of the control part 123 and supplied to a selector 116. In the selector 116, one or all of the local information from the memory 115 is selected and outputted via the selector 113. Thus, the local information is displayed on the display device 9 or printed out similarly to the above picture.

Note that, even the local information of the same area, information necessary for the user and not so are mixed therein. In the selector 116, only the local information needed by the user is selected corresponding to the operation of the control part 123.

In the selector 113, either the output of the decoding part 112 or the output of the selector 116 is selected and outputted.

Furthermore, in the ISDB receiver of FIG. 8, a time code is multiplexed as added information of video and audio accompanying with it, however, as the added information of video and audio accompanying with that, for example, an identification code to recognize a program composed of video and audio can be multiplexed other than that. In this case, a program corresponding to that identification code can be selected by previously inputting the identification code of a desired program. It enables, only when a desired program has transmitted, the user to select and output the program.

Note that, the details of the above ISDB transmitter and ISDB receiver have been disclosed in the patent application Nos. H7(1995)-207158 and H7 (1995)-243453 previously filed in the present applicant, for example.

Then, the adaptive decoding system 7, if the resolution of the decoded picture is lower than the resolution of the output device that will output the decoded picture among the display devices 9 and 10, printer 11 and computer display 12, performs resolution creating processing to generate the decoded picture corresponding to the resolution of the output device by linearly coupling the decoded picture having low resolution to the prescribed coefficients.

Note that, in the case where the number of pixels of the decoded picture is less than the number of pixels of the output device, for example, there is a method for matching the number of pixels of the decoded picture with the number of pixels of the output device by performing an interpolation by means of an interpolation filter or the like. However, since such simple interpolation cannot represent high frequency components not included in the original decoded picture, it cannot improve the resolution. On the contrary, in the resolution creating processing, such high frequency components can be represented as described later.

Moreover, in the case where the number of pixels of the decoded picture is more than the number of pixels of the output device, the number of pixels of the decoded picture is reduced to coincide the number of pixels of the output device by thinning or rearranging the mean values of several pixels or the like as in the case of hierarchical coding.

Figure 12:
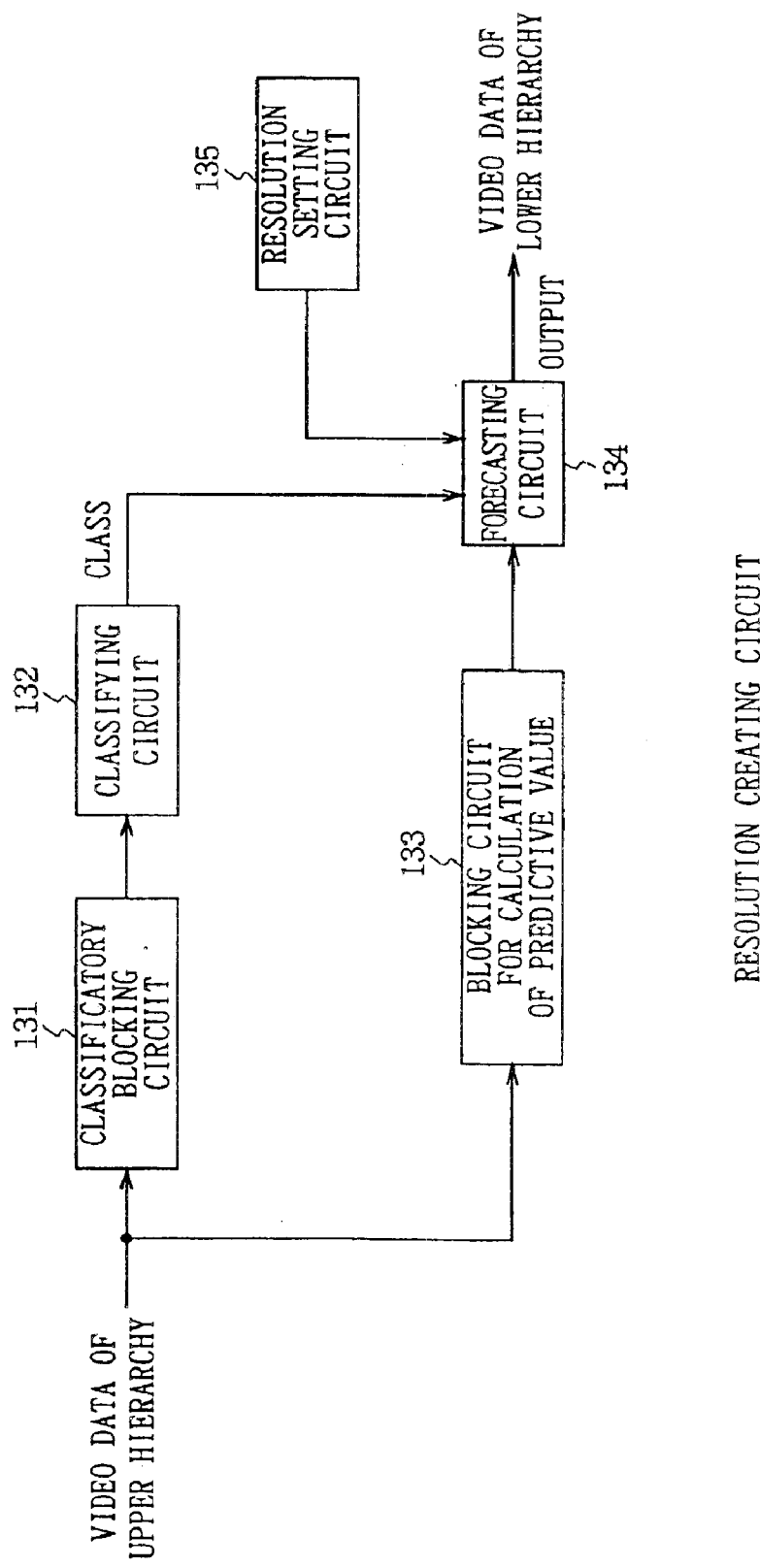
FIG. 12 is a block diagram showing a structural example of resolution creating circuit.

FIG. 12 shows a structural example of resolution creating circuit being a part of the adaptive decoding system 7 that performs the resolution creating processing.

Also here, pictures having high resolution (of which the number of pixels is large) are defined as the lower hierarchy pictures and pictures having lower resolution (or which the number of pixels is small) are defined as the upper hierarchy pictures similarly to the case of hierarchical coding.

For example, in FIG. 13, if the parts shown by a dot are assumed as pixels forming the lower hierarchy picture (hereinafter, it is preferably referred to as lower pixel) and the parts shown by a circle are assumed as pixels forming the upper hierarchy picture (hereinafter, it is preferably referred to as upper pixel), the resolution creating circuit converts the upper hierarchy picture formed of the pixels shown by the circles into the lower hierarchy picture formed of the pixels shown by dots.

That is, the upper hierarchy picture is supplied to a classificatory blocking circuit 131 and a blocking circuit for calculation of predictive value 133.

The classificatory blocking circuit 131 forms classificatory blocks that include the prescribed marked pixel from the upper hierarchy picture supplied thereto. More specifically, the classificatory blocking circuit 131 forms classificatory blocks each which is formed of 5×5 (horizontal by longitudinal) upper pixels and has the marked pixel in its center as shown by enclosing with a solid line in FIG. 13, for example.

Hereinafter, the 5×5-upper pixels which form the classificatory block (the part shown by circles in FIG. 13) is preferably denoted as follows: the upper pixel locating at the i-th from the left and the j-th from the top in the classificatory block is denoted by $B_{ij}$. Therefore, in the embodiment of FIG. 13, the classificatory block which has an upper pixel $B_{33}$ as the marked pixel is formed. The lower pixel generated (predicted) from the upper pixels forming the classificatory block (the part shown by a dot in FIG. 13) is preferably denoted by $A_{ij}$ similarly to the upper pixel, hereinafter.

If forming the classificatory block, the classificatory blocking circuit 131 outputs it to a classifying circuit 132. The classifying circuit 132 classifies the classificatory block into prescribed classes according to its property, and supplies thus obtained class information to a forecasting circuit 134.

To the forecasting circuit 134, a predictive value calculating block is further supplied from the blocking circuit for calculation of predictive value 133. In the blocking circuit for calculation of predictive value 133, for example, 3×3 pixels of predictive value calculating block centering the marked pixel $B_{33}$, as shown by enclosing with a dotted box, is formed and supplied to the forecasting circuit 134.

Here, the method for forming the predictive value calculating block and classificatory block is not only limited to the above. Note that, the form of the predictive value calculating block is basically free, however, the classificatory block is preferable to include the characteristics of the predictive value calculating block.

If receiving the predictive value calculating block and the class information of the marked pixel, the forecasting circuit 134 performs adaptive processing to obtain the predicted value of the pixel value of the lower pixels by linearly coupling predictive coefficients described later corresponding to the received class information to the pixel values of the upper pixels forming the predictive value calculating block. More specifically, for example, the forecasting circuit 134 obtains the predicted values of lower pixels $A_{43}$, $A_{44}$, $A_{45}$, $A_{53}$, $A_{54}$, $A_{55}$, $A_{63}$, $A_{64}$ and $A_{65}$ in the area of 3×3 pixels centering the marked pixel $B_{33}$ from predictive coefficients corresponding to the class and upper pixels forming the predictive value calculating block $B_{22}$, $B_{23}$, $B_{24}$, $B_{32}$, $B_{33}$, $B_{34}$, $B_{42}$, $B_{43}$ and $B_{44}$.

In the forecasting circuit 134, hereinafter, the similar processing is sequentially performed with setting all the upper pixels except for the pixel $B_{33}$ as the marked pixels. As a result, the predicted values of all the lower pixels forming the lower hierarchy picture are obtained.

Here, to the forecasting circuit 134, a resolution signal is supplied from a resolution setting circuit 135. The resolution setting circuit 135, for example, communicates with the output device to which the picture is outputted from the adaptive decoding system 7 (in the embodiment of FIG. 1, one of the display devices 9 and 10, printer 11 and computer display 12) and recognizing its resolution, and supplies the resolution signal representing the recognized resolution to the forecasting circuit 134.

In the forecasting circuit 134, the predictive coefficients of pictures having various resolutions have stored, so that a lower hierarchy picture can be obtained using the predictive coefficients of a resolution corresponding to the resolution signal from the resolution setting circuit 135.

In addition, it is able to input a resolution to the resolution setting circuit 135 by operating an operating part (not shown) for example, other than communicating with the output device.

Hereinafter, classifying processing in the classifying circuit 132 and adaptive processing in the forecasting circuit 134 will be described.

First, it will be described about the classifying processing.

Figure 14:
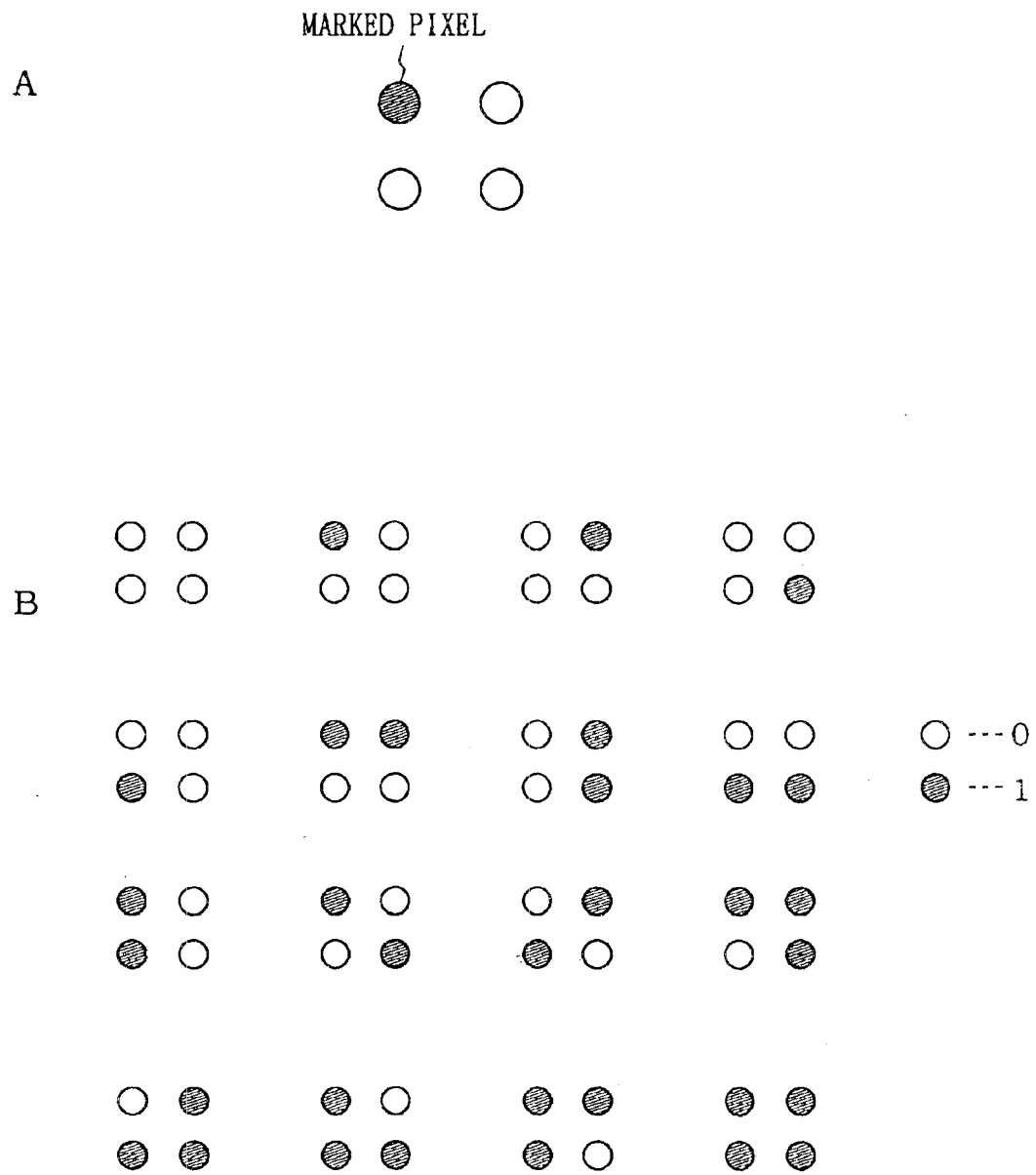
FIGS. 14A and 14B are diagrams explaining classification processing.

As shown in FIG. 14A, now it is assumed that a block composed of 2×2 pixels (classificatory block) is formed of a certain marked pixel and three adjacent pixels, and each pixel is represented by one bit (which has either level 0 or level 1). In this case, as shown in FIG. 14B, the block of 2×2 pixels, four pixels, can be classified into 16 (=$(2^1)^4$) patterns based on a level distribution of each pixel. Such classification by patterns is the classifying processing.

Note that, the classifying processing can be performed also considering the activities (complexity of picture and sudden change) or the like, of the picture (picture in the block).

Here, e.g., eight bits degree are normally assigned to each pixel. Moreover, in this embodiment, the classificatory block is composed of 5×5 pixels, 25 pixels as described above. Therefore, if the classifying processing is executed on such classificatory blocks, they will be classified into an enormous number of classes that is $(2^8)^{25}$.

To cope with that, the classifying circuit 132 is able to execute the ADRC processing on the classificatory blocks previous to the classifying processing. By executing the ADRC processing, the number of bits of the pixels forming a classificatory block can be reduced, and the number of classes can be reduced.

Next, the adaptive processing will be described.

For example, it is now considered that the predictive value E[y] of the pixel value (y) of a lower pixel is obtained based on a linear primary combined model provided by linearly coupling the pixel values of several upper pixels (hereinafter, they are preferably referred to as learning data) $x_1, x_2, \ldots$ to the prescribed predictive coefficients $w_1, w_2, \ldots$. In this case, the predictive value E[y] can be represented by the following equation:

$$E[y] = w_1 x_1 + w_2 x_2 + \ldots \tag{1}$$

To generalize that, a matrix W being a set of the predictive coefficients (w), a matrix X being a set of the learning data and a matrix Y' being a set of the predicted values E[y] are defined by the following equations:

$$X = \begin{pmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{pmatrix}$$

$$W = \begin{pmatrix} w_1 \\ w_2 \\ \cdots \\ w_n \end{pmatrix}, Y' = \begin{pmatrix} E[y_1] \\ E[y_2] \\ \cdots \\ E[y_m] \end{pmatrix}$$

As a result, the following observation equation is obtained.

$$XW = Y' \tag{2}$$

And it is considered to obtain predicted values E[y] approximate to the pixel values (y) of the lower pixels applying a least square to this observation equation. In this case, a matrix Y being a set of the pixel values of the lower pixels (hereinafter, they are preferably referred to as teaching data) (y) and a matrix E being a set of the residuals (e) of the predicted values E[y] to the pixel values (y) of the lower pixels are defined by the following equations:

$$E = \begin{pmatrix} e_1 \\ e_2 \\ \cdots \\ e_m \end{pmatrix}, Y = \begin{pmatrix} y_1 \\ y_2 \\ \cdots \\ y_m \end{pmatrix}$$

As a result, the following residual equation comes from the equation (2).

$$XW = Y + E \tag{3}$$

In this case, predictive coefficients $w_i$ to be used to obtain the predictive values E[y] approximate to the pixel values (y) of the lower pixels can be obtained by minimizing the square error such as the following:

$$\sum_{i=1}^{m} e_i^2,$$

Thus, it can be said that when the solution by that the above square error has differentiated by the predictive coefficient $w_i$ becomes 0, that is, the optimum value to obtain the predictive values E[y] approximate to the pixels (y) of the lower pixels is the predictive coefficients $w_i$ satisfying the following equation:

$$e_1 \frac{\partial e_1}{\partial w_i} + e_2 \frac{\partial e_2}{\partial w_i} + \cdots + e_m \frac{\partial e_m}{\partial w_i} = 0 (i = 1, 2, \ldots, n) \tag{4}$$

First, the equation (3) is differentiated by the predictive coefficient $w_i$, and obtaining the following equations:

$$\frac{\partial e_i}{\partial w_1} = x_{i1}, \frac{\partial e_i}{\partial w_2} = x_{i2}, \ldots, \frac{\partial e_i}{\partial w_n} = x_{in} (i = 1, 2, \ldots, m) \tag{5}$$

The equations (4) and (5) give the following equation:

$$\sum_{i=1}^{m} e_i x_{i1} = 0, \sum_{i=1}^{m} e_i x_{i2} = 0, \ldots, \sum_{i=1}^{m} e_i x_{in} = 0 \tag{6}$$

Considering the relationship among the learning data (x), predictive coefficient (w), teaching data (y) and residual (e) in the residuals equation of the equation (3), the following normal equations can be obtained from the equation (6).

$$\begin{cases} \left(\sum_{i=1}^{m} x_{i1}x_{i1}\right)w_1 + \left(\sum_{i=1}^{m} x_{i1}x_{i2}\right)w_2 + \ldots + \left(\sum_{i=1}^{m} x_{i1}x_{in}\right)w_n = \left(\sum_{i=1}^{m} x_{i1}y_i\right) \\ \left(\sum_{i=1}^{m} x_{i2}x_{i1}\right)w_1 + \left(\sum_{i=1}^{m} x_{i2}x_{i2}\right)w_2 + \ldots + \left(\sum_{i=1}^{m} x_{i2}x_{in}\right)w_n = \left(\sum_{i=1}^{m} x_{i2}y_i\right) \\ \left(\sum_{i=1}^{m} x_{in}x_{i1}\right)w_1 + \left(\sum_{i=1}^{m} x_{in}x_{i2}\right)w_2 + \ldots + \left(\sum_{i=1}^{m} x_{in}x_{in}\right)w_n = \left(\sum_{i=1}^{m} x_{in}y_i\right) \end{cases} \tag{7}$$

The normal equations of the equation (7) can be formed by the same number as the number of the predictive coefficients (w) to be obtained. Therefore, the optimum predictive coefficient (w) can be obtained by solving the equation (7): however, to solve the equation (7), it is needed that the matrix formed of coefficients concerning with the predictive coefficient (w) is regular). Note that, to solve the equation (7), e.g., a sweeping method (elimination of Gauss-Jordan) or the like can be applied.

As the above, in the adaptive processing, the optimum predictive coefficient (w) is previously obtained for each class, and the predictive values E[y] approximate to the pixel values (y) of the lower pixels are obtained using that predictive coefficient (w) by the equation (1). This adaptive processing will be performed in the forecasting circuit 134.

Figure 13:
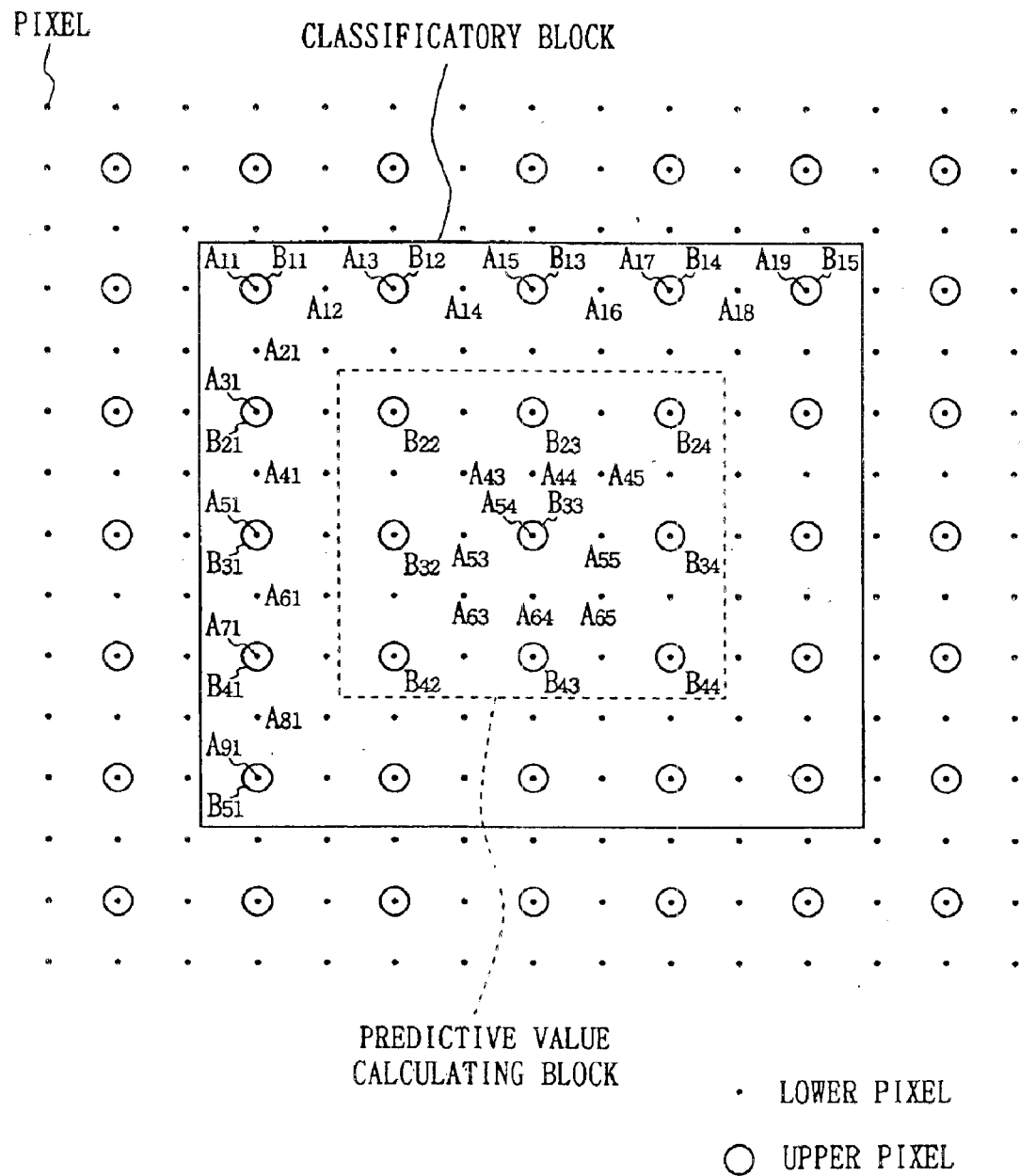
FIG. 13 is a diagram showing a classificatory block and a predictive value calculating block.

For example, it is assumed that the above learning is now performed on the classes obtained by the classification of the classificatory blocks formed of 5×5 pixels enclosed with a solid line in FIG. 13, and predictive coefficients $w_1(A_{43})$ to $w_9(A_{43})$, $w_1(A^{44})$ to $w_9(A_{44})$, $w_1(A_{45})$ to $w_9(A_{45})$, $w_1(A_{53})$ to $w_9(A_{53})$, $w_1(A_{54})$ to $w_9(A_{54})$, $w_1(A_{55})$ to $w_9(A_{55})$, $w_1(A_{63})$ to $w_9(A_{63})$, $w_1(A_{64})$ to $w_9(A_{64})$, $w_1(A_{65})$ to $w_9(A_{65})$ are respectively obtained, to respectively obtain the predictive values $E[A_{43}]$, $E[A_{44}]$, $E[A_{45}]$, $E[A_{53}]$, $E[A_{54}]$, $E[A_{55}]$, $E[A_{63}]$, $E[A_{64}]$ and $E[A_{65}]$ of lower pixels in a predictive value calculating block, $A_{43}$, $A_{44}$, $A_{45}$, $A_{53}$, $A_{54}$, $A_{55}$, $A_{63}$, $A_{64}$ and $A_{65}$. In this case, in the forecasting circuit 134, the predictive values $E[A_{43}]$, $E[A_{44}]$, $E[A_{45}]$, $E[A_{53}]$, $E[A_{54}]$, $E[A_{55}]$, $E[A_{63}]$, $E[A_{64}]$ and $E[A_{65}]$ of the HD pixels in the predictive value calculating block, $A_{43}$, $A_{44}$, $A_{45}$, $A_{53}$, $A_{54}$, $A_{55}$, $A_{63}$, $A_{64}$ and $A_{65}$ are respectively obtained according to the following equations corresponding to the equation (1).

$$E[A_{43}] = w_1(A_{43})B_{22} + w_2(A_{43})B_{23} + w_3(A_{43})B_{24} + \\ w_4(A_{43})B_{32} + w_5(A_{43})B_{33} + w_6(A_{43})B_{34} + \\ w_7(A_{43})B_{42} + w_8(A_{43})B_{43} + w_9(A_{43})B_{44}$$

$$E[A_{44}] = w_1(A_{44})B_{22} + w_2(A_{44})B_{23} + w_3(A_{44})B_{24} + \\ w_4(A_{44})B_{32} + w_5(A_{44})B_{33} + w_6(A_{44})B_{34} + \\ w_7(A_{44})B_{42} + w_8(A_{44})B_{43} + w_9(A_{44})B_{44}$$

$$E[A_{45}] = w_1(A_{45})B_{22} + w_2(A_{45})B_{23} + w_3(A_{45})B_{24} + \\ w_4(A_{45})B_{32} + w_5(A_{45})B_{33} + w_6(A_{45})B_{34} + \\ w_7(A_{45})B_{42} + w_8(A_{45})B_{43} + w_9(A_{45})B_{44}$$

$$E[A_{53}] = w_1(A_{53})B_{22} + w_2(A_{53})B_{23} + w_3(A_{53})B_{24} + \\ w_4(A_{53})B_{32} + w_5(A_{53})B_{33} + w_6(A_{53})B_{34} + \\ w_7(A_{53})B_{42} + w_8(A_{53})B_{43} + w_9(A_{53})B_{44}$$

$$E[A_{54}] = w_1(A_{54})B_{22} + w_2(A_{54})B_{23} + w_3(A_{54})B_{24} + \\ w_4(A_{54})B_{32} + w_5(A_{54})B_{33} + w_6(A_{54})B_{34} + \\ w_7(A_{54})B_{42} + w_8(A_{54})B_{43} + w_9(A_{54})B_{44}$$

$$E[A_{55}] = w_1(A_{55})B_{22} + w_2(A_{55})B_{23} + w_3(A_{55})B_{24} + \\ w_4(A_{55})B_{32} + w_5(A_{55})B_{33} + w_6(A_{55})B_{34} + \\ w_7(A_{55})B_{42} + w_8(A_{55})B_{43} + w_9(A_{55})B_{44}$$

$$E[A_{63}] = w_1(A_{63})B_{22} + w_2(A_{63})B_{23} + w_3(A_{63})B_{24} + \\ w_4(A_{63})B_{32} + w_5(A_{63})B_{33} + w_6(A_{63})B_{34} + \\ w_7(A_{63})B_{42} + w_8(A_{63})B_{43} + w_9(A_{63})B_{44}$$

$$E[A_{64}] = w_1(A_{64})B_{22} + w_2(A_{64})B_{23} + w_3(A_{64})B_{24} + \\ w_4(A_{64})B_{32} + w_5(A_{64})B_{33} + w_6(A_{64})B_{34} + \\ w_7(A_{64})B_{42} + w_8(A_{64})B_{43} + w_9(A_{64})B_{44}$$

(8)

$$E[A_{65}] = w_1(A_{65})B_{22} + w_2(A_{65})B_{23} + w_3(A_{65})B_{24} + \\ w_4(A_{65})B_{32} + w_5(A_{65})B_{33} + w_6(A_{65})B_{34} + \\ w_7(A_{65})B_{42} + w_8(A_{65})B_{43} + w_9(A_{65})B_{44}$$

Note that, the adaptive processing differs from interpolation processing from the viewpoint of that components included in only the lower hierarchy picture are represented. That is, it can be said that the adaptive processing is the same as the interpolation processing using so-called interpolation filter, so far as only the equations (1) and (8) are viewed. However, since the predictive coefficients (w) corresponding to the tap coefficients of the interpolation filter are obtained by using the teaching data (y) quasi learning, also the components included in the lower hierarchy picture can be represented. From that reason, the adaptive processing can be said that quasi a processing having a resolution creating function.

The detail of the adaptive processing has been disclosed in the publication of the patent laid-open No. H5(1993)-328185 previously filed by the present applicant, for example.

Figure 15:
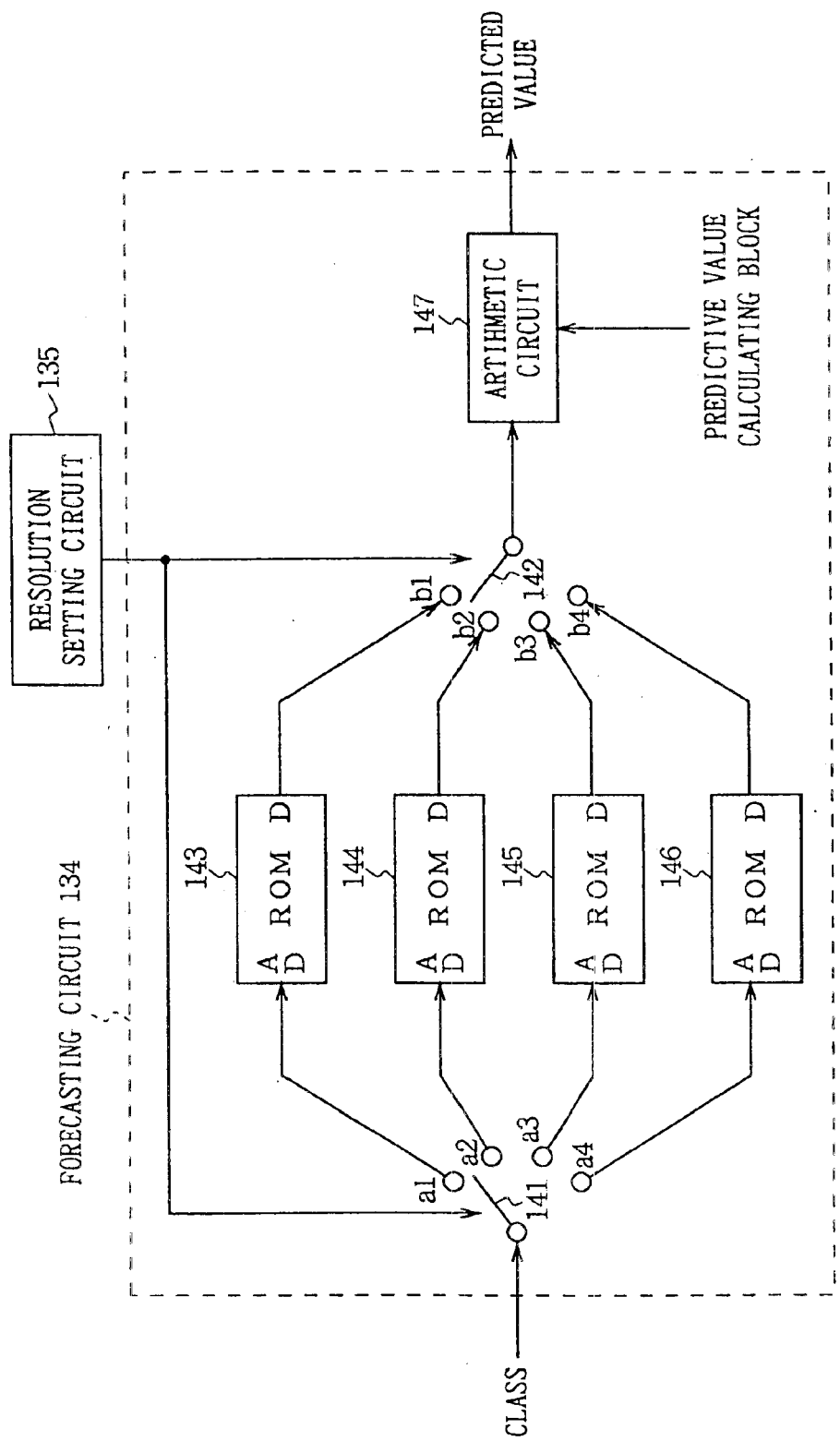
FIG. 15 is a block diagram showing a structural example of forecasting circuit 134 of FIG. 12.

Now, FIG. 15 shows a structural example of the forecasting circuit 134 of FIG. 12.

The class information from the classifying circuit 132 are supplied to a switch 141. The switch 141 selects one of terminals a1 to a4 corresponding to the resolution signal from the resolution setting circuit 135. The terminals a1 to a4 of the switch 141 are connected to the address terminals (AD) of read only memories (ROM) 143 to 146 respectively. Thereby, the class information from the classifying circuit 132 is supplied to one of the ROMs 143 to 146 via the switch 141 as an address.

A switch 142 selects one of terminals b1 to b4 corresponding to the resolution signal from the resolution setting circuit 135 similarly to the switch 141. The terminals b1 to b4 are connected to the data terminals D of the ROMs 143 to 146 respectively. Note that, the switch 142 interlocks the switch 141, and for example, if the switch 141 selects one of the terminals a1 to a4, the switch 142 selects corresponding one of terminals b1 to b4.

In the ROMs 143 to 146, the predictive coefficients for each class obtained by the learning described above have been stored in an address corresponding to the class. Specifically, in the ROMs 143 to 146, the predictive coefficients to be used to convert, for example, if the aforementioned hierarchical coding is performed, the picture of the most upper hierarchy into a lower hierarchy picture corresponding to the resolution of the display device 9 or 10, printer 11 or computer display 12 have been stored respectively.

To an arithmetic circuit 147, the predictive value calculating block is supplied from the blocking circuit for calculation of predictive value 133, and the predictive coefficient is supplied from one of the ROMs 143 to 146 is supplied via the switch 142, respectively. The arithmetic circuit 147 performs a sum of products operation corresponding to the equation (1) or (8) using the predictive value calculating block and the predictive coefficient, and obtaining the lower hierarchy picture corresponding to the resolution of the output device.

In the forecasting circuit 134 constructed as the above, one of the terminals a1 to a4 is selected by the switch 141 corresponding to the resolution signal from the resolution setting circuit 135, and also a corresponding one of the terminals b1 to b4 is selected by the switch 142 with interlocking it.

Then, the class information from the classifying circuit 132 is supplied to the address terminal of one of the ROMs 143 to 146 that has been connected to the terminal selected by the switch 141 (one of the terminals a1 to a4) (hereinafter, it is preferably referred to as selected ROM). In the selected ROM, the predictive coefficient stored in the address corresponding to the class supplied to its address terminal is read out and outputted from its data terminal.

Since the switch 142 interlocks the switch 141 as described above, the predictive coefficient read out from the selected ROM is supplied to the arithmetic circuit 147 via the switch 142.

To the arithmetic circuit 147, the predictive value calculating block is supplied from the blocking circuit for calculation of predictive value 133 in addition to the predictive coefficient, as described above. In the arithmetic circuit 147, the sum of products operation corresponding to the equation (1) or (8) is performed using the predictive value calculating block and the predictive coefficient supplied thereto, so that the lower hierarchy picture corresponding to the resolution of the output device is generated and outputted.

Thus, the user can view the picture corresponding to the output device.

Note that, in the above embodiment, the predictive coefficients have stored in the adaptive decoding system 7. However, the predictive coefficients may be transmitted from the transmitting side as the information necessary for decoding. Also methods for forming the classificatory block or the predictive value calculating block can be instructed from the transmitting side.

Industrial Capability

The present invention is applicable to a video processing system including a video camera, ATV, video editor, etc., which deals with video data having a standard resolution, high resolution and low resolution.

What is claimed is:

1. An adaptive decoding system for receiving and decoding a plurality of video signals of different resolutions corresponding to a plurality of display units having the same resolutions, comprising:

an integrated services digital broadcasting (ISDB) receiver having a signal separator for receiving and separating ISDB data into a bit stream encoded with adaptive dynamic range coding (ADRC), additive information, and a timing code;

an additive information decoder for decoding the additive information;

an ADRC decoding circuit for demultiplexing and decoding said bit stream on a block basis using said time code and forming the decoded blocks of said bit stream into said plurality of value signals using a frame forming circuit; and a selector for selectively outputting the decoded plurality of video signals and the decoded additive information to the corresponding plurality of display units having the same resolution.

2. The adaptive decoding system according to claim 1, wherein said additive information includes computer graphics and network data.

3. The adaptive decoding system according to claim 1, wherein said additive information comprises information of local area interest to a viewer and is identified by an area code.

4. The adaptive decoding system according to claim 1, wherein said plurality of video signals comprises a high definition video signal and a standard definition video signal.

* * * * *